United States Patent [19]

Schornack

[11] Patent Number: 4,956,563
[45] Date of Patent: Sep. 11, 1990

[54] STANDBY POWER SUPPLY

[75] Inventor: Louis W. Schornack, Park Ridge, Ill.

[73] Assignee: Perma Power Electronics, Inc., Chicago, Ill.

[21] Appl. No.: 118,789

[22] Filed: Nov. 9, 1987

Related U.S. Application Data

[63] Continuation-in-part of Ser. No. 118,257, Nov. 9, 1987.

[51] Int. Cl.$^5$ ............................................... H02J 9/00
[52] U.S. Cl. .......................................... 307/66; 307/87
[58] Field of Search ............................... 307/64, 66, 87

[56] References Cited

U.S. PATENT DOCUMENTS

| | | | |
|---|---|---|---|
| 3,337,743 | 8/1967 | Rolfes | 307/66 |
| 3,389,268 | 6/1968 | Jamieson et al. | 307/66 |
| 4,323,820 | 4/1982 | Teich | 307/66 X |
| 4,366,389 | 12/1982 | Hussey | 307/66 |
| 4,400,625 | 8/1983 | Hussey | 307/66 |
| 4,468,571 | 8/1984 | Heavey et al. | 307/66 |
| 4,508,974 | 4/1985 | Henderson | 307/66 |
| 4,510,401 | 4/1985 | LeGoult | 307/66 |
| 4,782,241 | 11/1988 | Baker et al. | 307/66 |
| 4,799,185 | 1/1989 | Taylor | 307/66 X |

Primary Examiner—William M. Shoop, Jr.
Assistant Examiner—Sharon D. Logan
Attorney, Agent, or Firm—Wallenstein, Wagner & Hattis, Ltd.

[57] ABSTRACT

A battery operated standby inverter power supply uses an electromechanical relay switching network to connect and disconnect line power between input and output terminals. An overcurrent relay pulser rapidly opens the switching system relay contacts upon transition to battery mode, and a breakover diode network accelerates field collapse in the relay coil attendant to reversion of the relay to its normally closed condition attendant to each battery to line transition. A fault detector establishes acceptable line voltage thresholds, the exceeding of either of which triggers operation from line to battery mode. These triggering thresholds are automatically pulled closer together during initial system startup. An overload detector senses the load current in line mode and prevents actuation to battery mode if the load connected to the power supply output exceeds the rated current value of the inverter. A wiring detector prevents initial power-up to line mode in the event that the house wiring has been miswired so as to interchange the house ground and the voltage return lines.

13 Claims, 18 Drawing Sheets

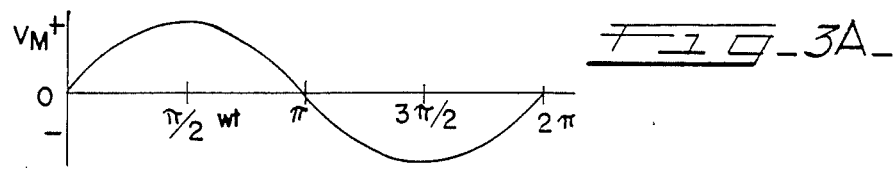
FIG_3A_
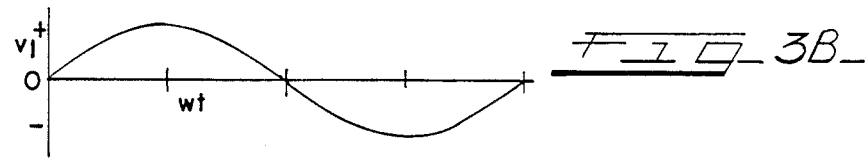
FIG_3B_
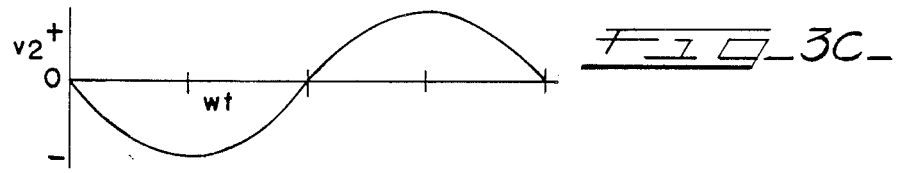
FIG_3C_
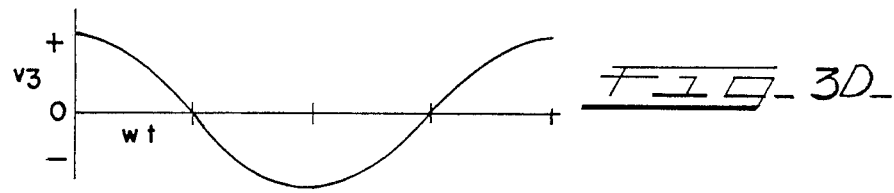
FIG_3D_
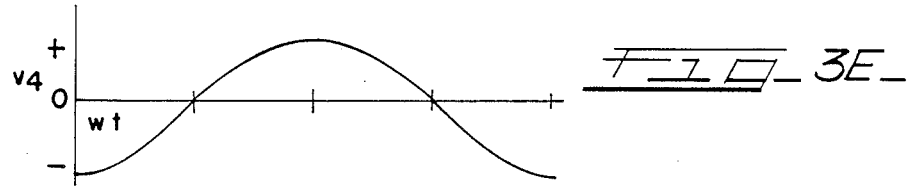
FIG_3E_
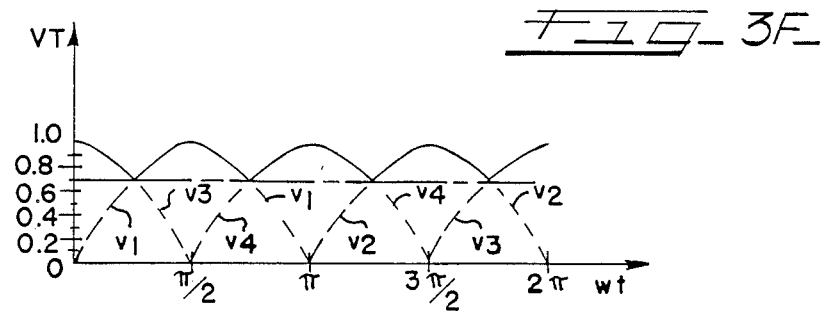
FIG_3F_

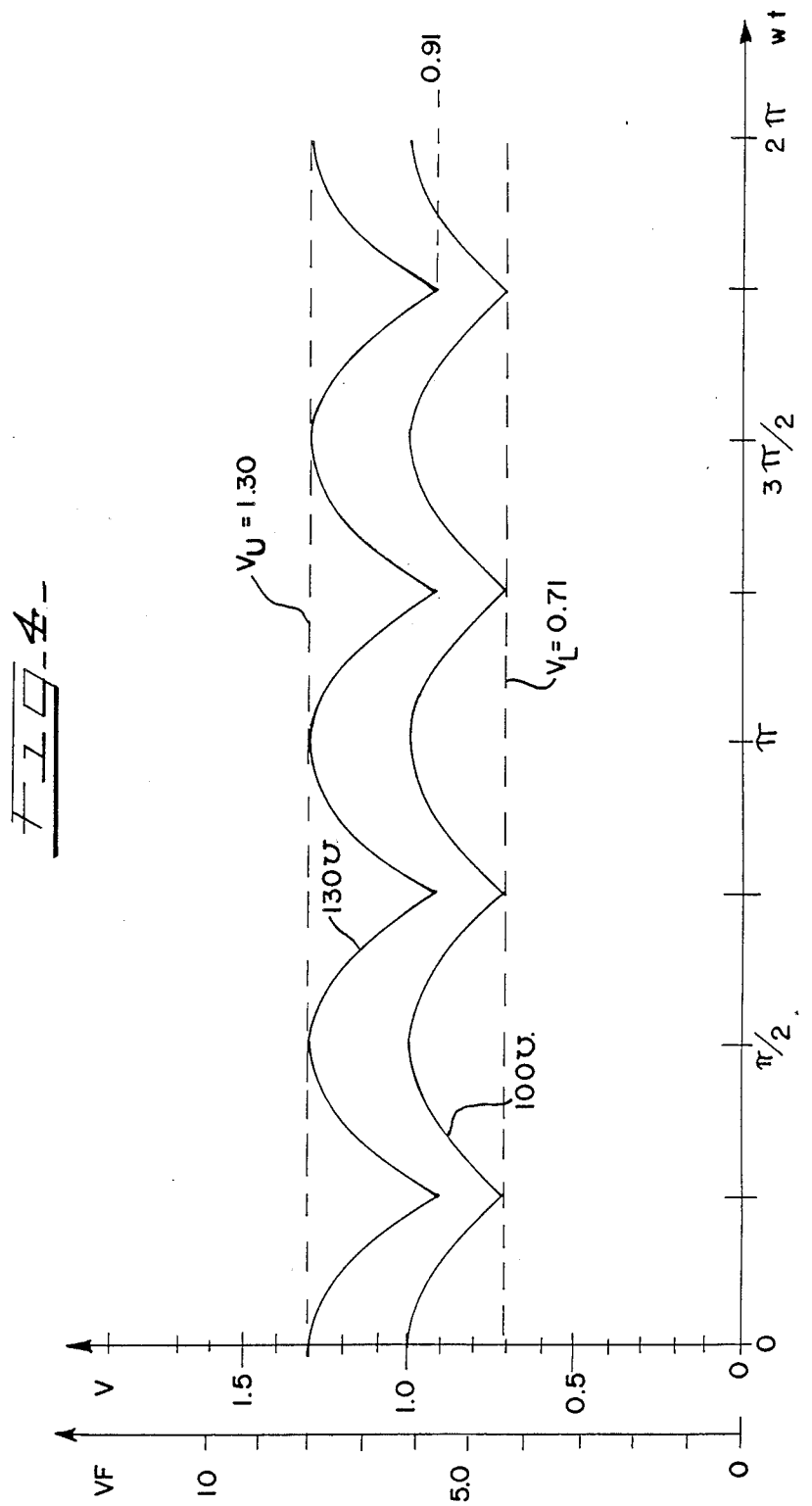

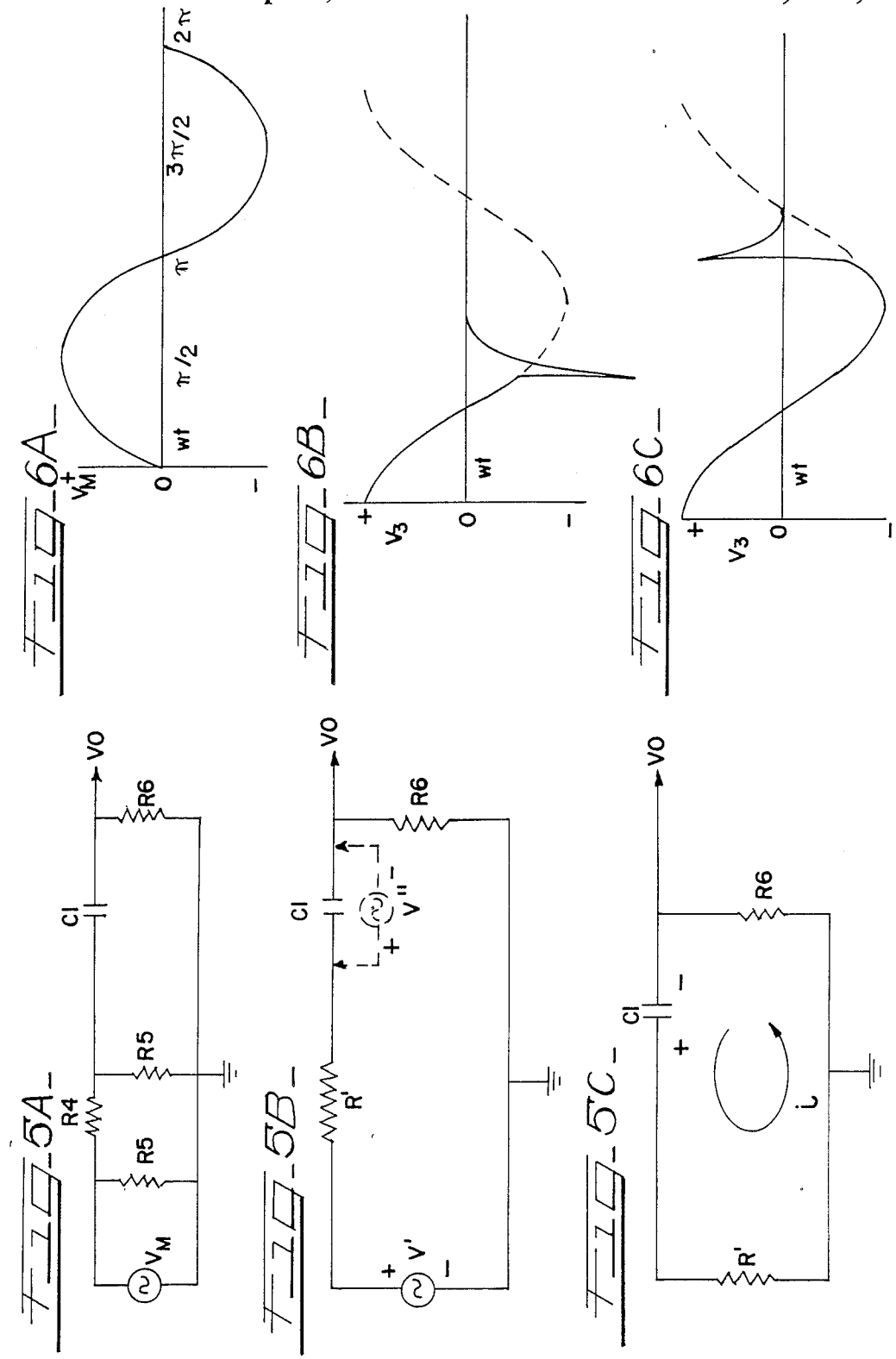

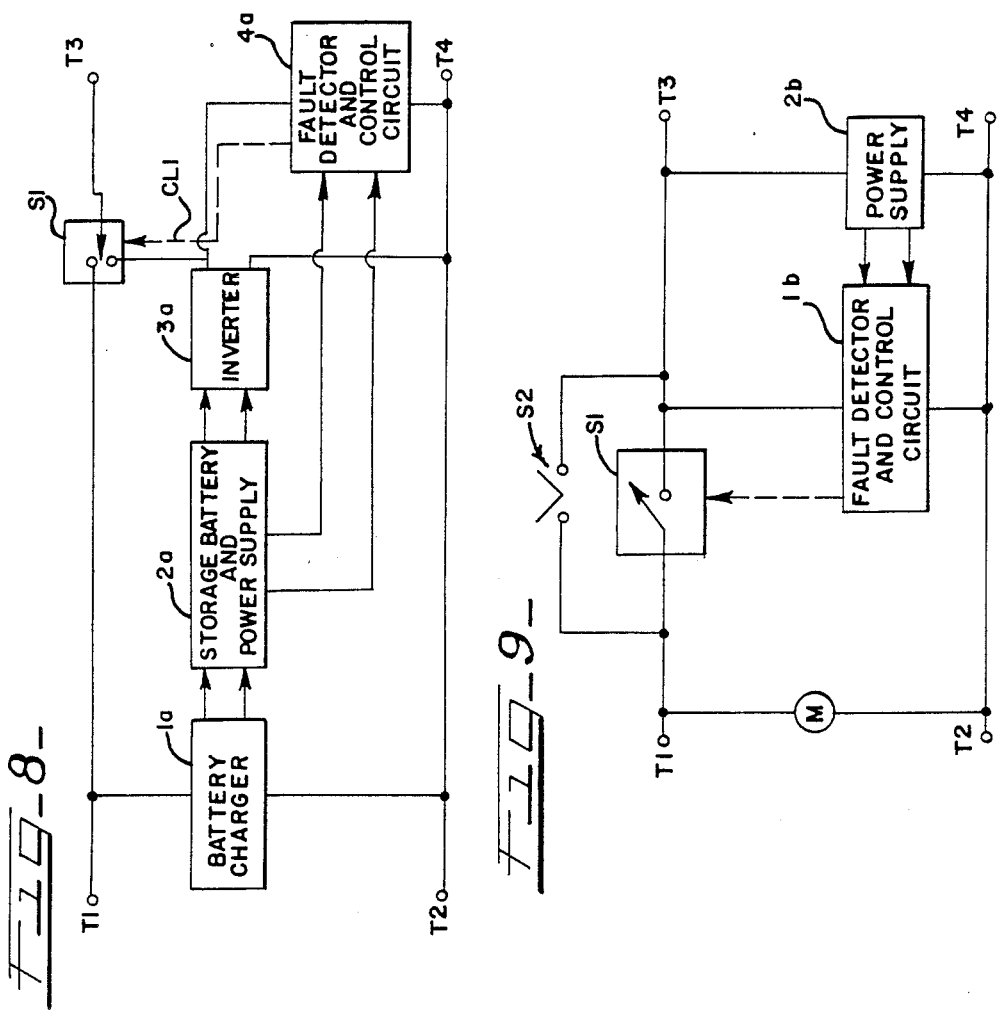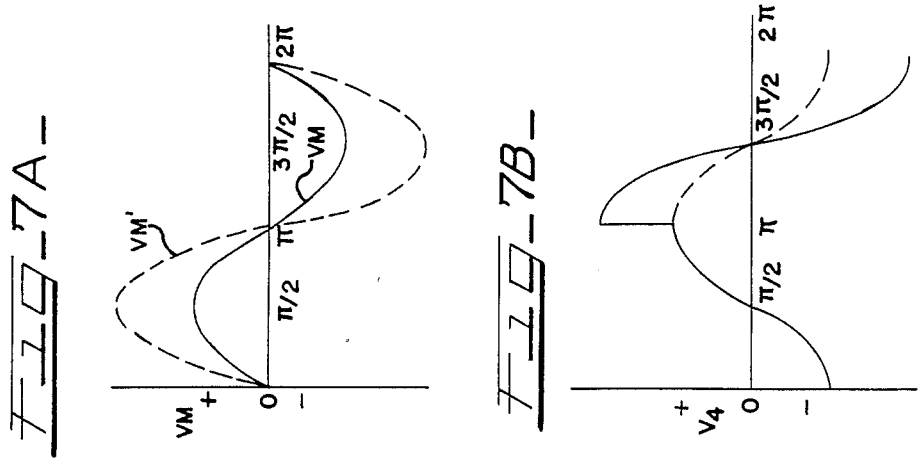

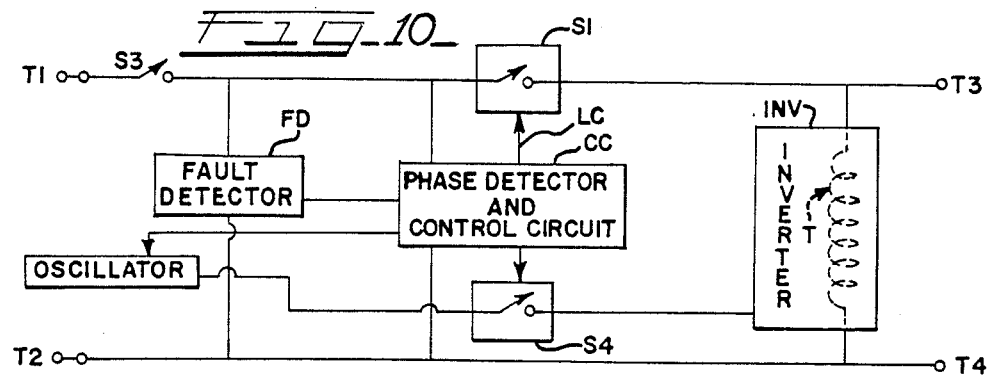
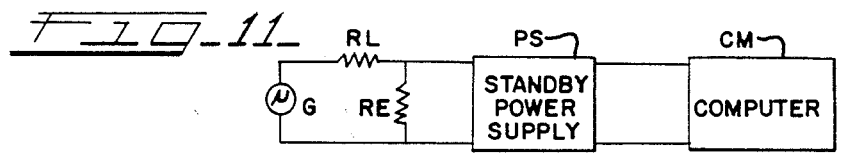
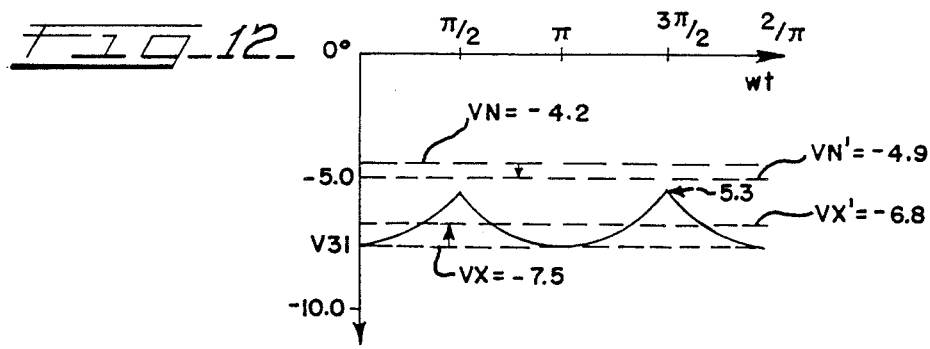
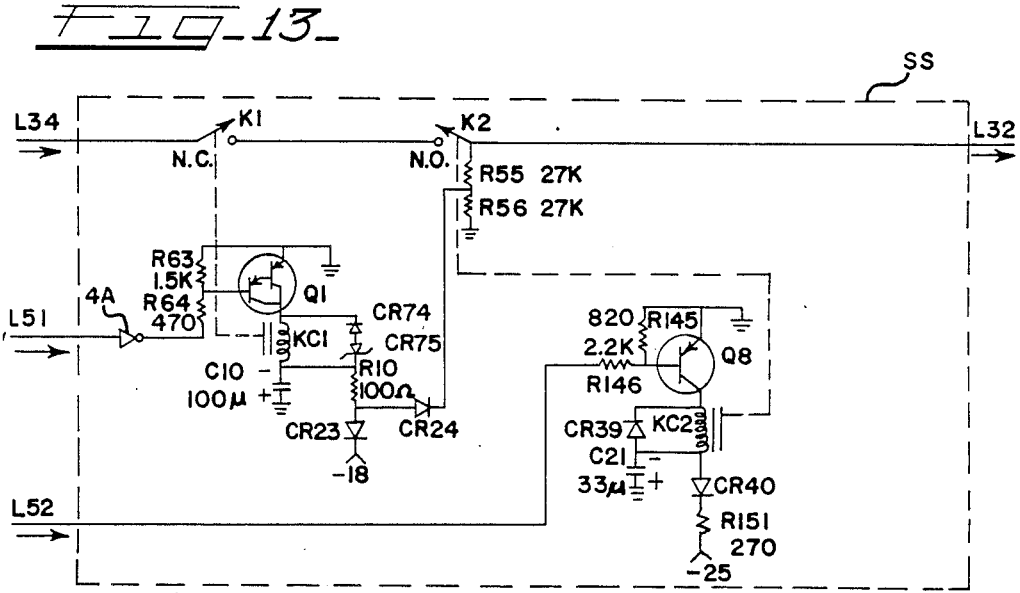

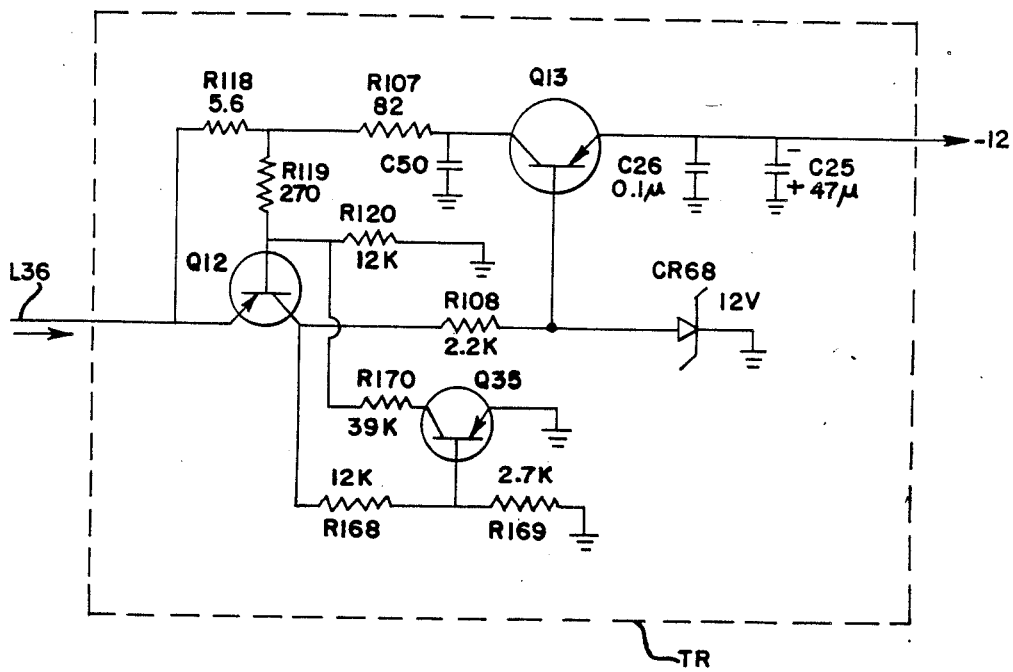
FIG_19_
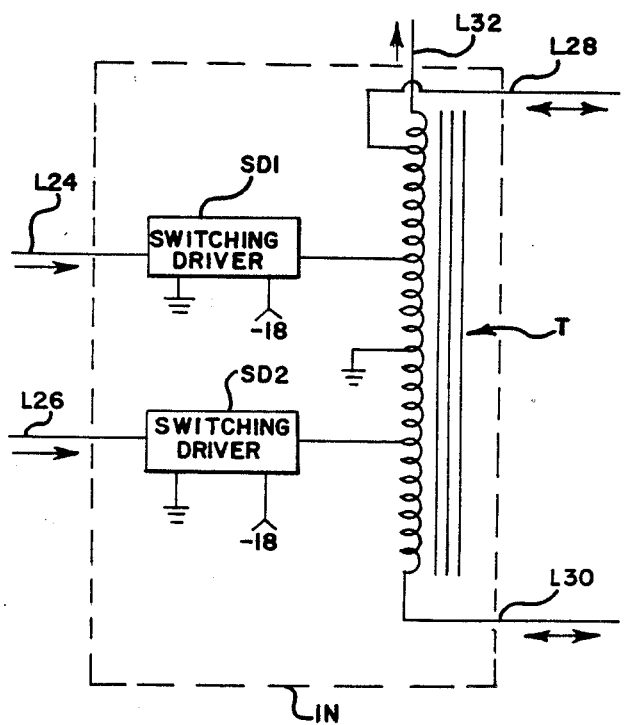
FIG_20_

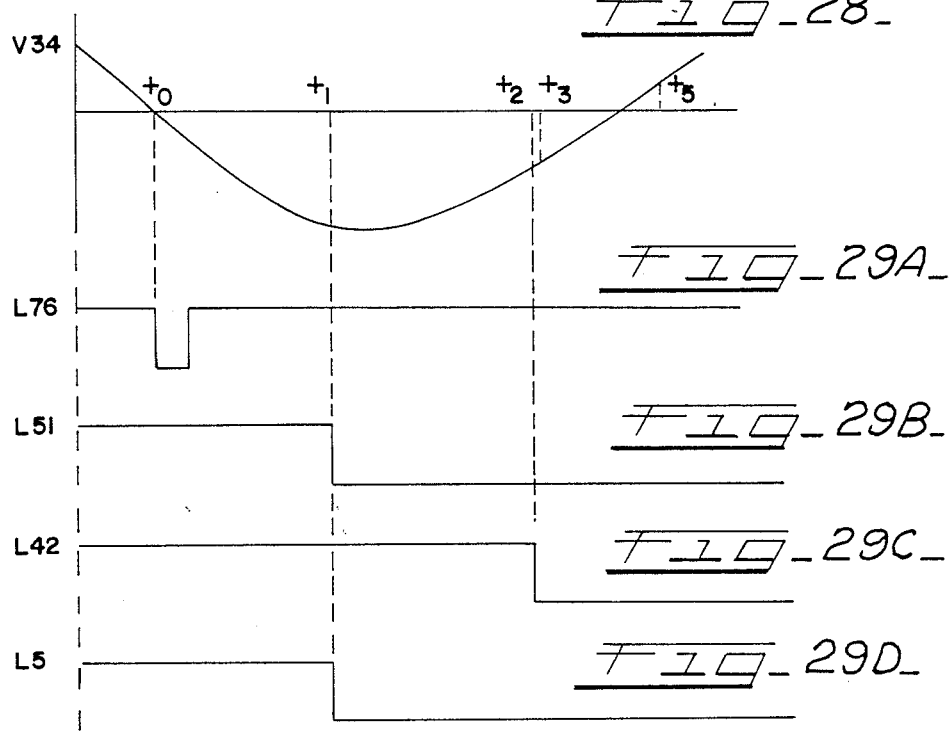
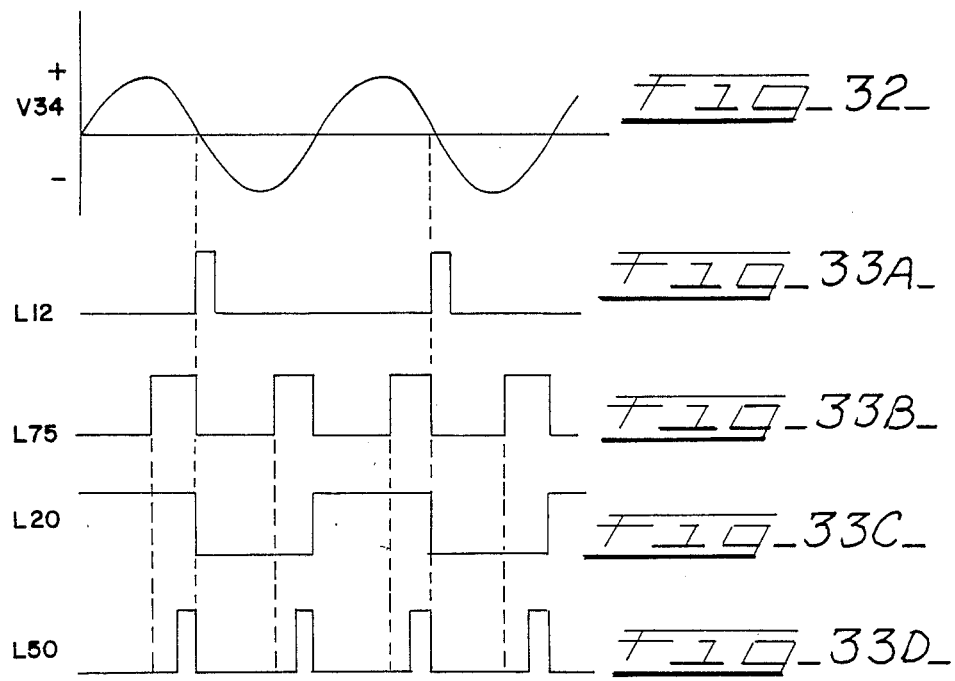

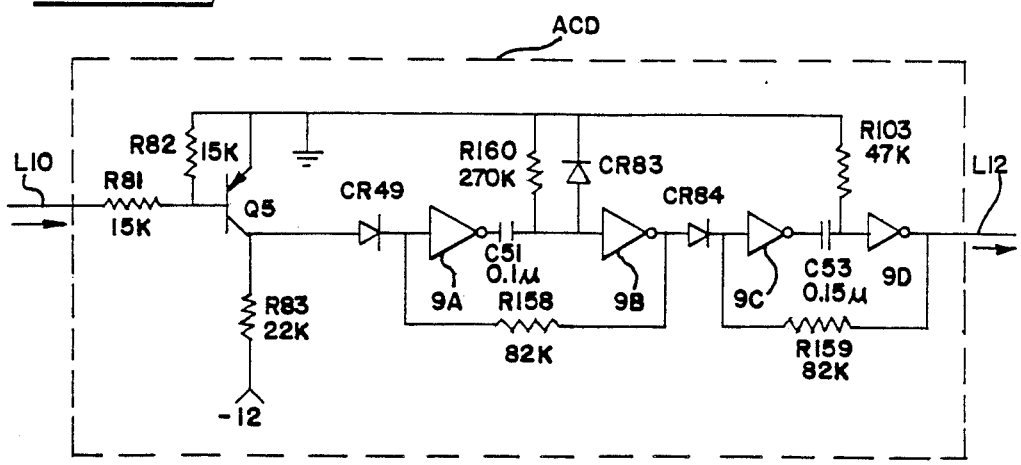
FIG_30_
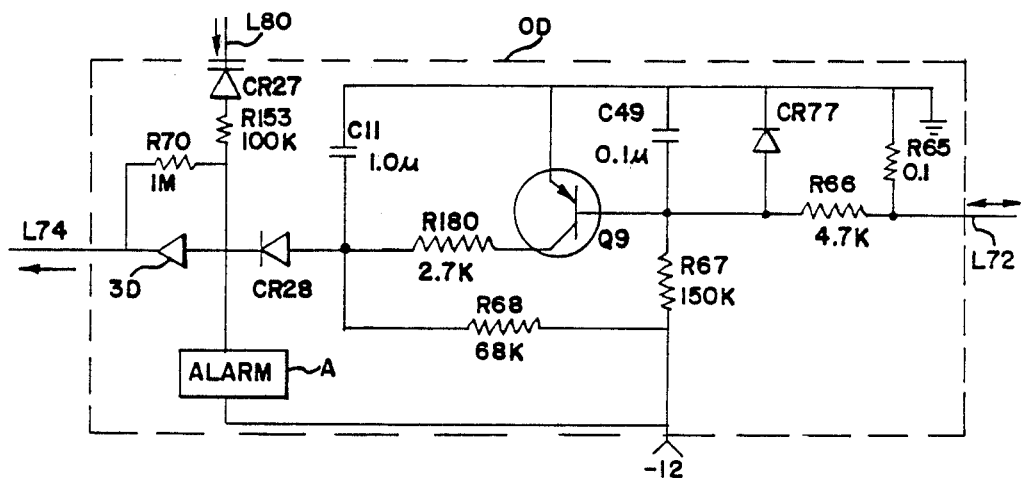
FIG_31_

STANDBY POWER SUPPLY

RELATED APPLICATIONS

This application is a continuation-in-part of U.S. application Ser. No. 07/118,257, filed Nov. 9, 1987.

DESCRIPTION

Technical Field

The technical field of the invention is the electrical control art, wherein a battery-operated inverter is used to take over the supply of electrical power to an A.C. load in the event of a power line failure.

BACKGROUND ART

The use of standby power supplies containing a battery and an inverter for maintaining A.C. electrical power to computers during failure of the power lines voltage is well known. It is highly desirable that the changeover operation be carried out as quickly as possible in order to avoid the loss of the contents of volatile memory. Ideally, such changeover systems should be very quick-acting, typically in the approximate range of one millisecond, since the filter capacitors of the on-board power supply of the computer are not designed to supply power for more than a time of the order of one-quarter of the line voltage waveform period, i.e., approximately 3 or 5 milliseconds.

In addition to the requirement for rapid reaction time for achieving the changeover from line power to battery power, there is the necessity for a power line voltage fault detector which will give a rapid and unambiguous reaction to power line abnormalities mandating system changeover from normal power line operation ("line mode") to battery-powered operation ("battery mode"). In addition to total power line voltage failure, such abnormalities also include transient and relatively long-term line overvoltage and undervoltage conditions as well.

There are two general approaches known in the art for providing such emergency backup power. One employs a battery-powered inverter permanently connected to the load and having a battery charger connected into the power lines, and in normal operation providing a charging rate at least equal to the discharge rate of the battery at maximum inverter output power. In such systems the fault detector is used to disable the battery charger, typically by totally disconnecting it from the input power lines in case of dangerously high line voltages. The inverter will continue to run and supply power for as long as adequate charge remains in the battery. Such a system, however, requires that the battery charging circuit must be able to deliver to the battery at least as much power as the maximum rated output power of the inverter. This typically mandates an additional high wattage transformer, greatly increasing the cost and weight of the system.

An alternative approach, which is described detail in the instant application, uses the inverter output transformer to charge the battery from appropriate taps thereon when the system is in line mode, and which disconnects the power lines from the output terminals during battery mode, at which time the inverter is switched on by the fault detector to an active condition to provide power to the load for a period of at least several minutes. In the event that the load is a digital computer, this time interval gives the operator time to store volatile memory contents in non-volatile storage, and further gives him time to make sure that the system is properly shut down with no disc recording heads in transit. Power failure under such circumstances can frequently result in damage to magnetic memory discs. U.S. Pat. No. 3,389,268, issued to Jamieson et al, U.S. Pat. No. 4,366,389, issued to Hussey and U.S. Pat. No. 4,400,625, issued to Hussey show representative prior art inverter systems wherein the inverter transformer is permanently connected across the output terminals.

One basic problem with these latter systems is that provision must be made to provide electrical power to the control switching circuitry and the fault detector in those cases where the battery is completely dead. Provision must be made to provide such power from the input power lines without exposing such circuitry to a burn-out situation in case the power line voltage goes to a catastrophically high value. At least one case is known wherein the neutral line of a Y-connected power distribution system was inadvertently broken, resulting in massive damage to a number of digital computers being fed therefrom.

It is desirable that the inverter transformer be permanently connected to the output terminals so that in normal line operation, the flux phasing will be proper when a transition to battery operation is made. Such systems are known in the art, and normally employ an oscillator to drivingly energize the inverter, the oscillator in turn being phase locked with the incoming electrical line voltage and being disabled from this phase-locked condition to free-run at a frequency very close to the normal line frequency in battery mode. Attendant to the line-to-battery transition the oscillator synchronization is disabled, and suitable switching circuitry is enabled so that the inverter is synchronously excited with respect to the flux phasing in the transformer.

Such a system has a concomitant necessity for a rapid disconnecting of the power supply output terminals from the power line input terminals, and requires that the inverter excitation be switched on almost immediately after this cut-out operation occurs. Additionally, when the fault detector senses restoration of normal line voltage, the inverter must be brought into phase lock again with the power line, after which time the inverter must be disabled immediately prior to operation of the input-output switching system to line mode so that normal line operation may again be resumed. This switchover operation is normally timed to be done in the vicinity of an axis crossing of the power line voltage, so that during the brief period wherein no power is delivered to the output terminals the filter capacitors of the power supplies associated with the loads can maintain adequate internal voltage during this transition period.

To accomplish these properly timed switchovers recourse may be made to silicon controlled rectifiers of the type which can be immediately turned off when in a conducting condition. If the power supply is designed to provide many hundreds of watts, or possibly a kilowatt, the current demands of the triggering circuitry which extinguishes such silicon controlled rectifiers is extremely high, and this requires that the system power supply and certain associated circuitry be designed with these very large currents in mind. This seriously increases the cost of such a power supply.

Another problem that the fault detector must contend with arises when the power distribution line system has substantial internal resistance. In particular, if the power supply is actuated to battery mode for significant period of time, resulting in a significant run down of the battery voltage, and hence the output voltage, then upon restoration of normal line operation, a high transient inrush current will be experienced, this transient current representing the charging transient of various power supply capacitors not only in the load, but in the power supply as well. This can cause an oscillatory condition to occur by pulling the power line input voltage below the low-voltage triggering threshold of the fault detector, resulting in an undesirable series of re-triggerings between line and battery mode until stable system operation is achieved. Finally, inductive transients associated with system changeover from one mode to the other must not cause serious triggering of the fault detector.

There remains a need for a standby power supply system which addresses all of the above problems in a cost-efficient way.

SUMMARY OF THE INVENTION

The power supply of the invention is of the previously mentioned type wherein the inverter transformer is permanently connected across the output terminals. Oscillator synchronization to drive the inverter is, as previously discussed, synchronized with the power line in line mode, free-runs at approximately 60 Hertz in battery mode, and re-synchronizes with the power line upon restoration of normal line voltage. According to a feature of the invention, an electromechanical relay of known response time is used to establish the connected and disconnected condition between input and output terminals. When in line mode and a line voltage abnormality is sensed mandating changeover to battery operation, the relay energizing coil is given a massive over-energization beyond the normally rated coil current to speed up the relay break-open, the relay being of the normally closed type. Thereafter, the relay current is reduced to somewhat less than the rated actuating current, so that adequate hold-open current is provided. From the known release time of the relay, a delayed timing pulse turns on the inverter shortly after the relay contacts open.

In battery mode when a return to proper line voltage is sensed by the fault detector, oscillator synchronization is first re-established, by timing pulses generated at a line voltage axis crossing. From these timing pulses a delayed pulse is generated, the length of this delay being related to the known closure time of the relay upon deenergization of the coil. According to a feature of the invention, the coil is deenergized so that initial relay contact closure occurs in the immediate vicinity of axis crossing, and on the early side thereof, so that any attendant relay contact bounce occurs in the immediate vicinity of the axis crossing, the final firm contact being established almost immediately thereafter. A similar delayed pulse is used to disable the inverter immediately prior to the time of first relay contact.

According to a further feature of the invention, the relay coil de-energization is speeded up by an appropriately configured diode network including the high-voltage breakover diode which maintains the transient voltage across a relay coil attendant to power supply current turn off thereto at a value of approximately 60 volts, thus accelerating field collapse. According to a further feature of the invention during start up mode, i.e., when the power supply is first turned on, only actuation to line mode is allowed initially thereafter. The system must wait for a proper power line voltage before connecting the input and output terminal. The previously mentioned transient inrush problem is contended with by setting the voltage acceptance range of the fault detector from their normal levels, e.g. 100 volts r.m.s. to 130 volts r.m.s. to a significantly narrower acceptance range, e.g. 107 volts and 118 volts, respectively. Only if the line voltage is within this narrowed acceptance range will the switching system supply power from the input to the output terminals. After a short time delay, normal voltage threshold levels are automatically established in the fault detector.

According to a feature of the invention the fault detector is disabled for a short period of time attendant to closure of the switching system to establish line power at the output to prevent spurious triggering of the fault detector because of inrush currents. A similar disabling also occurs attendant to each battery-to-line transition so that similar spurious triggering does not occur because of the previously mentioned problem wherein the power lines may have significant resistance, and the battery may be at a relatively low condition.

According to a feature of the invention when in power-up mode after closure of a manually operated master power switch, for the power switching system connecting the input and output terminals together, as well as power for the fault detector and related portions of a system control logic, are provided from a preferably transformerless power supply deriving its power from the input terminals and self-operating through an interrogation cycle. In the preferred form of the invention, a latching voltage regulator is turned on when the voltage across an internal storage capacitor charged from the input power lines reaches a certain value, and maintains its output voltage in a regulated condition until the current drawn from the capacitor causes its voltage to sag to a given level. At this time, the regulator turns off automatically, the capacitor undergoes a recharging process, and the cycle repeats. Sufficient power is provided to allow a single interrogation by the fault detector of the status of the power line voltage. This cycle repeats until an in-range sensing is reduced, after which time the switching system is actuated to a closed line mode condition, whereupon a battery charger powered from the inverter transformer provides power to the system. Thus, by this means no power supply transformer is connected to the input terminals, and the inverter transformer is only connected to the input terminals when he line voltage is within acceptable limits.

According to a feature of the invention, an overload detector is provided which senses the current delivered to the associated loads in line mode, and which prevents changeover to battery operation in the event that the load connected thereto is sufficiently to exceed the inverter transformer rating.

According to a feature of the invention, a wiring fault detector circuit senses for possible accidental interchange of the high voltage return lead and the house ground lead in the power lines wiring, and prevents any transfer of electrical power to the output in start-up mode if such an error is detected. Such accidental miswirings do occur, and can cause sensitive equipment to malfunction.

Other features and aspects of the invention will become apparent upon making reference to the specification, claims, and drawings to follow.

BRIEF DESCRIPTION OF DRAWINGS

FIGS. 3A-3F represent voltage waveforms at various points in the circuit of FIG. 2.

FIG. 4 shows composite voltage waveforms produced by the detector circuit under 100-volt and 130-volt line voltage input conditions.

FIGS. 5A-5C show the development of an equivalent circuit for a portion of the network shown in FIG. 2, showing equivalent reductions for purposes of transient analysis.

FIGS. 6A-6C show respectively the power line waveform, the voltage waveform $v_3$ under power line failure conditions in the third quadrant of the power line voltage of FIG. 6A, and a similar situation attendant to power line failure in the fourth quadrant of FIG. 6A.

FIG. 7A shows a normal power line voltage waveform, as well as a massively increased in-phase power line voltage waveform resulting from a sudden imbalance in a three-phase power distribution system.

FIG. 7B shows the response of the interior waveform shown in FIG. 3E in the event that the imbalance occurs at a power line voltage axis crossing.

FIG. 8 is a block schematic diagram of the principal elements of a representative uninterrupted power supply of the "on-line" type.

FIG. 9 is a block schematic diagram of the principal elements of an automatic A.C. power circuit breaker.

FIG. 10 is a schematic block diagram of the basic elements of an off-line power supply.

FIG. 11 is a block diagram showing such a supply used to power a computer and in turn being powered from local power distribution lines.

FIG. 12 shows the composite waveform produced by an advanced version of the fault detector shown in FIG. 14.

FIG. 13 shows the circuit of a switching system forming a subsystem of general system layout of the power supply shown in block diagram in FIG. 15.

FIG. 19 shows the circuit diagram of a threshold regulator shown in block schematic form in FIG. 18.

FIG. 20 shows a circuit of the inverter shown in block schematic form in FIG. 15.

FIGS. 26a-26e show timing diagrams of various lines in the power supply during the transition shown in FIG. 25.

FIG. 28 shows relevant timing points on the power line voltage waveform during a battery-to-line transition.

FIGS. 29a-29e show timing diagrams of various lines in the power supply during the battery-to-line transition shown in FIG. 28.

FIG. 30 shows a circuit diagram of the axis crossing detector shown in block diagram form in FIG. 15.

FIG. 31 shows the circuit of the overload detector shown in block diagram form in FIG. 15.

FIG. 32 shows the power line waveform for reference purposes discussing oscillator synchronization.

FIGS. 33A-33D show relevant control line voltage behavior when the oscillator is running in synchronous phaselocked condition with the power line waveform shown in FIG. 32.

DETAILED DESCRIPTION

Figure 1:
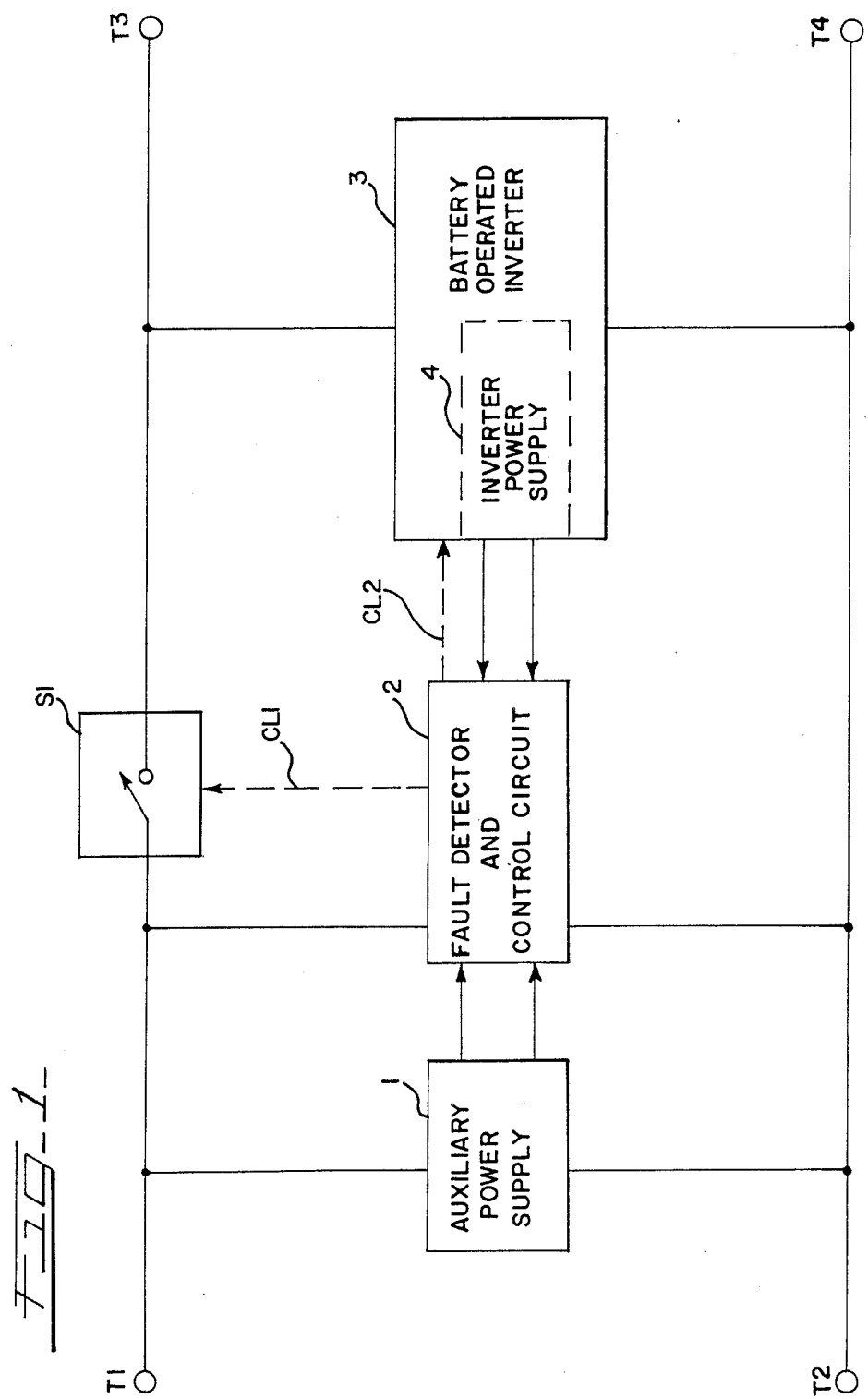
FIG. 1 is a block schematic diagram of the principal elements of a representative standby power supply of the "off-line" type.

While this invention is susceptible of embodiment of many different forms, there is shown in the drawings and will herein be described in detail preferred embodiments of the invention with the understanding that the present disclosure is to be considered as an exemplification of the principles of the invention and is not intended to limit the broad aspect of the invention to embodiment illustrated.

FIG. 1 shows the principal elements of a representative standby power supply system of the off-line type, and towards which many features of the instant application are oriented. Input voltage from the power line is applied to input terminals T1, T2. Output terminal T4 is directly connected to input terminal T2, and output terminal T3 is coupled through a power switch S1 to input power terminal T1. Power switch S1 may in practice take a variety of forms, most commonly one or more semiconductor switches, or alternatively a mechanically driven relay. A fault detector and control circuit 2 is connected across the input terminals T1,T2 to monitor the input waveform and to produce appropriate control signals on control lines CL1 and CL2 in the event that a power line abnormality is detected. Under acceptable line voltage conditions, power is supplied to the fault detector and control circuit 2 by means of an auxiliary power supply 1 connected across the input terminals T1,T2. As long as the input power line voltage is within acceptable limits, the fault detector and control circuit 2 maintains the switch S1 in a closed condition by an appropriate control signal condition on control line CL1. A battery-operated inverter 3 is connected across the output terminals T3,T4. It is energized from a dormant to a power-producing state responsively to an appropriate control condition on line CL2. As long as the input power line voltage received at the input terminals T1,T2 is within acceptable limits, the fault detector and control circuit 2 commands the inverter 3 to a dormant, non-energized condition.

When an input voltage abnormality of sufficient magnitude requiring changeover to battery operation is sensed, the fault detector and control circuit 2 actuates the inverter 3 to an active power-producing mode, and simultaneously opens switch S1. Power is now supplied to the output terminal T3,T4 by the inverter 3. Inverter 3 contains an internal power supply 4 which not only powers the associated circuitry of the inverter, but which will also supply to the fault detector and control circuit 2 in this mode of running. This is necessary because the fault detector and control circuit must remain continuously powered in the event of total power failure at the input terminals T1,T2, thus shutting down the auxiliary power supply 1. The fault detector and control circuit 2 is thus maintained in an active mode to respond to subsequent restoration of input power line voltage within acceptable limits, whereupon reversion to the original standby mode is carried out.

The power supply of the present invention is governed by a great number of internal control signals to govern system mode changeover. Nearly all of these are initiated by the fault detector and control circuit 2 shown in FIG. 1, and thus a detailed description of the relevant portions of this circuit must be discussed at this point, first as generally applied, and second as specifically applied to power supplies having the inverter output transformer permanently connected to its output terminals and designed to cope with high current loads and relatively large power line impedance.

Considering first the general form of the fault detector, FIGS. 2-4, 6A-6C, 7 show a circuit for reacting rapidly to detect power line voltage abnormalities, and the waveforms associated therewith. A replica of the power line voltage $V_M$ between input power terminals M1, M2 is provided via a resistive attenuator R1, R2 having a nominal attenuation of the order of 30 to 1 or so. This attenuated signal is fed directly to the anode of a diode D1, having its cathode connected to a summing resistor R3. Half-wave voltage pulses $v_1$ are therefore provided to the diode D1, these voltage pulses being in phase with the line voltage $V_M$ as shown in FIG. 3B. A unity gain analog inverter I1 similarly feeds an inverted analog replica $v_2$ of the power line waveform to the summing resistor R3 through the anode of diode D2.

A substantially less attenuated replica of the power line voltage $V_M$ is provided through a resistive attenuator R4,R5 having nominal values of 10 kilohms and 22 kilohms, respectively. This waveform is passed through a differentiating phase-shift network consisting of capacitor C1 connected to feed the output of the attenuator R4,R5 to resistor R6, having a nominal value of 5 kilohms. Capacitor C1 has a nominal value of 0.033 microfarad, and thus has a capacitive reactance at power lines frequency (60 Hertz) of the order of 80 kilohms. This value is twenty times the value of resistor R6. Thus, voltage pulses $v_3$ are delivered to diode D3 to supply current pulses to the resistor R3, but displaced in phase with respect to voltage pulses $v_1$ by approximately 90°. A corresponding replica $v_4$ of the remaining half-waves of the phase-shifted waveform supplied by the phase-shift network C1,R6 is similarly provided via an analog inverter I2 to resistor R3 through the cathode of diode D4.

The total waveform developed across resistor R3 is shown in FIG. 3F, which shows the voltage VT developed across resistor R3 as a summation of individual voltage pulses $v_1,v_2,v_3,v_4$. It should be noted, however, that the composite waveform VT developed across resistor R3 is not a simple summation of the voltage applied to the diodes D1-D4, since in general only one of these diodes will be conducting at any given time. Thus, considering, for example, the waveforms $v_1$ and $v_3$, as long as $v_3$ is greater than the voltage $v_1$, diode D3 will be conducting, and the output voltage VT will be held at the relatively high value $v_3$, therefore holding diode D1 in a blocking condition. This state of affairs will continue until the waveform $v_1$ rises to equal the falling value of waveform $v_3$, as shown in the first quadrant of FIG. 3F. Beyond this point diode D3 is turned off, and diode D1 is turned on. The output voltage waveform VT developed across resistor R3 therefore always represents the magnitude of the largest of the four voltage waveforms $v_1$-$v_4$ present at any time.

Normalizing these individual voltage pulses to unity amplitude for purposes of discussion, the resultant voltage $V_T$ is a time-varying waveform having a frequency four times the power line frequency, and characterized by maximum values of 1.0 and minimum values of 0.71.

Referring to the values of the capacitor C1 and the resistors $R_S$, R4, R5 and R6, it may readily be established that the actual phase shift produced by this network is approximately 82°. FIGS. 2A–2E show idealized situations wherein 90° phase shifts are assumed; however, the slight difference between the actual and the ideal phase shift has a negligible effect in terms of the idealized description given hereinabove. Resistor R7 represents associated system loads, e.g., power supplies, etc., and is given a nominal value of 2 kilohms.

In the particular case of total failure of power line voltage, it is clear that the unshifted voltage pulses $v_1,v_2$ will vanish essentially instantaneously if the power failure occurs during their respective durations. With respect to the phase-shifted current pulses $v_3,v_4$, a power failure occurring exactly at a power line voltage axis crossing, as, for example, at 180° FIG. 3A, will cause the waveform $v_4$ shown in FIG. 3F to immediately collapse to zero. This may be seen from FIG. 2 as follows. Under normal power line conditions, the instantaneous voltage across capacitor C1 will be very nearly equal to the instantaneous voltage across resistor R5. This follows because the reactance of capacitor C1 is of the order of 80 kilohms, a value well in excess of the resistance of resistor R6, and of the parallel combination of resistors R4 and R5. Thus, to this degree of approximation, the voltage across capacitor C1 closely follows and is equal to the voltage delivered at the juncture of resistors R4 and R5. It therefore follows that if the power line voltage fails at an axis crossing, i.e., at a point where it is instantaneously zero, then the voltage across capacitor C1 is similarly zero. An open-circuit condition exists at that time between the power input terminals M—M and the generating stations supplying power to the power lines. Since no voltage is being delivered to the input power terminals M—M, and since there is no instantaneous charge on capacitor C1, it follows that the voltage across resistor R6 will instantaneously fall to zero, as a result of which the composite voltage waveform produced across resistor R3 must also instantaneously go to zero. In the case of line voltage failure at points significantly removed from axis crossings, the transient behavior of the voltage VT is quite complex. Discussion of this aspect of system operation will be deferred until the remaining circuitry has been described.

It will further be noted that if the power line voltage should slowly rise to unacceptable limits, as is sometimes encountered in poorly regulated electrical distribution systems, then it is clear that the composite waveform VT shown in FIG. 3F will similarly undergo a general upward shift. Conversely, if the line voltage undergoes a relatively slow decrease, the composite waveform VT shown in FIG. 3F will similarly undergo a corresponding gradual shift downwards.

Finally, it should be observed that the appearance of sudden transients at the input terminals M—M will in general be faithfully replicated across resistor R6 because the high value of the reactance of capacitor C1 renders the network R4-R5-R6-C1 to be a differentiating network. Such transients will therefore instantaneously appear superimposed on the composite waveform VT as a result.

To establish the desired limits at which an error-detection control signal will be produced, the output voltage VT developed across resistor R3 is fed to the inverting input of a comparator AC2 and to the non-inverting input of a comparator AC1. The inverting input of comparator AC1 is set to a chosen value by adjustment of potentiometer Pl so as to bias this input at a chosen value which will trigger comparator AC1 to output a low (grounded output) state whenever VT rises above a chosen bounding value. Similarly, the non-inverting input of comparator AC2 is adjusted to a chosen bias via potentiometer P2 to set a lower bounding value of VT. Thus, any excursion of the voltage VT above the maximum value established by the setting of potentiometer Pl, or alternatively below the minimum value established by potentiometer P2, will cause the output of the associated comparator to go low.

FIG. 4 shows two composite waveforms. The upper waveform has been chosen to correspond to a maximum allowable r.m.s. line voltage of 130 volts, and has been normalized for illustrative purposes to have its peak amplitude at 1.30 volts. The vertical axis labeled VF is to be temporarily ignored. Since the composite waveform has a minimum value of 0.71 times its peak value, then it follows that this waveform has for its lower bound the value of 0.91 volts. The lower waveform corresponds to a minimum allowable input r.m.s. line voltage of 100 volts, and correspondingly has a maximum value of 1.0 volts and thus has a minimum value of 0.71 volts. Accordingly, to cause the comparator C3 to trigger low above 130 volt line input, its inverting input is established at a potential of 1.30 volts by an appropriate setting of potentiometer Pl. Similarly, the non-inverting input of comparator C2 is set to a value of 0.71 volts. If the line voltage falls below 100 volts, then this comparator will be similarly triggered low.

In a practical standby power supply system it is desirable that the power supply not be actuated from line to battery mode responsively to short transients of minor importance on the power lines. Also, in the event that the power line voltage excursions shown in FIG. 4 pass slightly beyond the upper or lower limits, then it is clear that the responsive comparator AC1 or AC3 will be continuously triggered at a rate of 240 times per second. For self-evident reasons, it is not desirable that such comparator pulsing cause 240-cycle actuation of the output control line LC between states commanding a change from line mode to battery mode and vice versa.

Immunity from undesired triggering from such minor transients of relatively short duration, as well as elimination of the undesired 240 Hertz oscillation is achieved as follows. It will be recalled that comparators AC1 and AC2 are connected so that when their associated input voltage limit is exceeded, their outputs go low, by which is meant that their output stage transistors are turned on. Comparators AC1 and AC2 are of the open-collector type, such as type LM339. With particular reference to the high voltage warning circuit based upon comparator AC1, the output is connected to a resistor R15, this resistor in turn being connected to the positive system supply rail through resistor R14. Across resistor R14 is a capacitor C2 of nominal value 0.1 microfarad. Resistor R14 has a nominal value of 330 kilohms and R15 has a nominal value of 2.2 kilohms. As long as the line voltage is less than the maximum allowable value, the output line LA of comparator AC1 will be open, thus causing line LA to idle at the positive rail voltage. Responsively to any transition of the power line waveform above the maximum value established by the setting of potentiometer P1, comparator C1 will trigger, thus essentially grounding output line LA. The voltage across resistor R14, however, is momentarily held at zero by capacitor C2, and the change of state of output line LA is not reflected at the juncture between resistors R15 and R14 until a time established by the charging time of the network R15-C2 elapses. This decay time is approximately 200 microseconds. As a result of this, short-term transients of the 100-microsecond range are not passed to the input of driver DR1.

With respect to the previously mentioned 240 Hertz triggering problem, although comparator AC1 will in fact trigger at this rate, thus grounding output line LA 240 times per second, under such circumstances a rapid return of this line to the positive rail voltage is prevented by the holding action of capacitor C2 across resistor R14. A low-to-high transition at output line LA under such circumstances will be characterized by a relatively slow rate of rise on line LD, being characterized by the decay time of the network R14-C2, a value of the order of 30 milliseconds, which is much longer than the 4 millisecond period of the 240 Hertz waveform. Thus, line LD will be held low, and will have a relatively modest ripple component on it. To prevent this ripple component from appearing on output control line LC, a Schmitt trigger (latching comparator) circuit, based upon driver DR1, is employed. An input resistor R7 of 560 kilohms is inserted in line LD to drive the input of driver DR1. A positive feedback resistor R8 of nominal value of one megohm is connected therearound. A significant feedback hysteresis is produced in the triggering of driver DR1 to prevent retriggering by such ripple on the input waveform.

The output of driver DR1 is connected to the anode of diode D5, the cathode of which is connected to line LC, line LC being tied to the positive system rail through resistor R4. Consequently, when the input line voltage exceeds the range set by potentiometer Pl, line LC is pulled to ground.

Considerations identical to the foregoing are applicable to the low-range comparator system using comparator AC2. As in the case of comparator AC1, an out-of-range condition causes the output line LB of comparator AC2 to be grounded. A similar rapid attack and slow release network consisting of resistors R9,R10,C3 driving a similar Schmitt trigger based upon driver DR2 is used to pull line LC down through diode D6 to again place an out-of-range low state on the control line LC.

The behavior of the composite waveform VT under conditions of total power line failure in regions remote from axis crossings of the power line voltage must now be considered in more detail. FIG. 5A shows the equivalent of the circuit elements of FIG. 2 supplying the output voltage VO to the anode of diode D3 and to the inverting input of inverter I2. The A.C. voltage source is equal in magnitude to the voltage $V_M$ applied to the input terminals M—M. This may be further reduced by well-known principles to yield the equivalent network shown in FIG. 5B having an A.C. voltage source V' in series with an equivalent resistance R'. In terms of the circuit values shown in FIG. 2, R' has the approximate value of 8 kilohms, and the equivalent generator V' produces a voltage approximately equal to 0.70 times the value of $V_M$. Recalling the previous approximation of the reactance of capacitor C1 is the dominant element in the loop of FIG. 5A (and also FIG. 5B), it follows that the voltage across capacitor C1 may be approximately be set equal to the instantaneous voltage of the equivalent generator V' in the manner shown in FIG. 5B. The phantom generator V'' is shown merely to establish for purposes of discussion the magnitude of the voltage across C1 at any instant of time. It will be essentially equal to the voltage of the equivalent generator V', and will have instantaneous polarity as shown, i.e., opposing the voltage V'.

Figure 2:
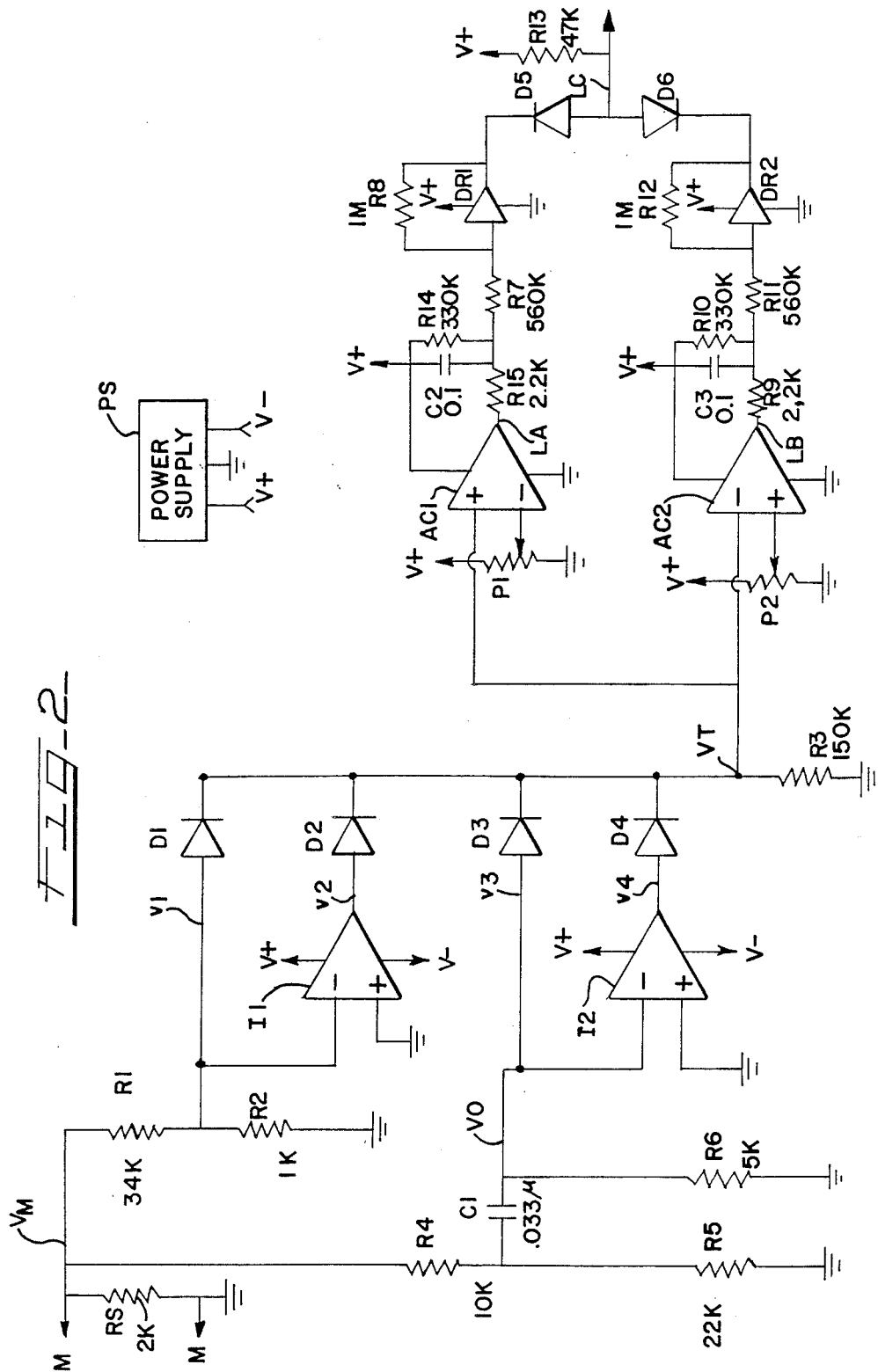
FIG. 2 is a schematic diagram of a detector circuit for the instantaneous detection of voltage abnormalities of power line voltage.

FIG. 5C shows the transient situation in this network in the event that the power line voltage delivered to input terminals M—M (FIG. 2) instantly fails, as, for example, when a power line breaks. The equivalent network under such conditions is as shown in FIG. 5C, and will result in a transient current i flowing in the direction shown according to the polarity shown. Thus, if the voltage fails when voltage $V_M$ shown in FIG. 2 is above ground, i.e., positive, then the capacitor C1 will be charged as indicated in FIGS. 5B and 5C. Such failure must result in immediate current flow i to produce an immediate negative output voltage V0. The magnitude of this voltage will be the instantaneous value of the voltage V' reduced by the network attenuation, i.e., by a factor R6 divided by the sum of R6 and R'. In terms of previously stated values, this attenuation will have a value of approximately 0.39.

One may generalize the transient behavior of the output voltage V0 in the event of power line failure as follows. Irrespective of what voltage VO was present before failure, the output voltage VO immediately reverts to a value equal to the instantaneous voltage present on capacitor C1, i.e., power line voltage $V_M$ reduced by the factor 0.39 and reversed in phase with respect thereto. Since peak power line voltages can exceed 100 volts, it is clear that VO under certain circumstances can reach values of the order of 40 volts or so. After this immediate reversion to a new value, VO then decays to zero as capacitor C1 discharges through resistors R6 and R' at a rate set by the network decay constant. In terms of the values derived, the network decay time constant is approximately 0.4 milliseconds. In line with the previous discussion of power line failure immediately at an axis crossing, it is clear that, the instantaneous power line voltage being zero, the voltage VO simply drops instantly to zero.

Consideration must now be given in view of the foregoing to situations wherein the power line voltage fails in regions significantly remote from axis crossings. Consideration must be first given to establishing the proper magnitude of the voltage VO of FIGS. 2 and 5A. It will be recalled that the voltage acceptance range of the comparators AC1,AC2 are 130 volts r.m.s. and 100 volts r.m.s., respectively. With respect to the high range setting, 130 volts r.m.s. corresponds to a peak voltage of 182 volts, resulting in a steady state peak output voltage VO of 8.0 volts. This is derived from the equivalent circuit of FIG. 5B, wherein the dominant element in the loop is the capacitive reactance of C1 of 80 kilohms and the equivalent voltage source V' is equal to 0.7 times the power line voltage $V_M$. Thus, the high range output voltage limit for voltage VO is 8.0 volts. This may be seen in the left-most vertical axis VF shown in FIG. 4. The out-of-range signal level corresponding to 100 volts r.m.s. input may similarly be shown to produce a peak output voltage VO of 6.2 volts, yielding for its minima the value of 4.4 volts. Thus, the comparators AC1,AC2 must be set to trigger at 8.0 volts and 4.4 volts, respectively.

One may now consider the magnitude of the transients in the output voltage VO under power line failure conditions at points substantially remote from, for example, 180° in the reference waveform of FIG. 6A. FIG. 6B shows the general behavior of the non-inverted output voltage waveform $v_3$ of FIG. 2 It should be recalled at this point that in the event of power line failure, voltage waveforms $V_1$ and $V_2$ instantaneously go to zero. All that must be considered here is the behavior of the output voltage VO. It will also be recalled that the voltage across the resistor R3 will be that of the dominant positive voltage of the pair $v_3, v_4$. To analyze this situation, consideration need only be given for the moment to the waveform $v_3$.

As previously pointed out, if the power line voltage $V_M$ of FIG. 6A fails exactly at the 180° point, then, referring to FIGS. 5B and 5C, there is essentially no initial voltage on capacitor C1, and the voltage $v_3$ will immediately collapse to zero. A similar situation will, of course, occur with respect to voltage $v_4$. If, on the other hand, power line failure occurs well in advance of this point, i.e., somewhere in the second quadrant of the line voltage $V_M$, then an immediate negative transient will appear on the $v_3$ waveform having its initial value equal to the equivalent value V', i.e., 0.7 times the instantaneous value of the power line voltage $V_M$. As previously stated, this voltage will have for its immediate peak value a voltage equal to the equivalent generator V' reduced by the attenuation factor of the network R',R6, i.e., by 0.39.

It will be appreciated that these initial transients can be extremely strong. Thus, it may be readily shown that if the power line voltage $V_M$ exceeds 29 volts, then the negative transient shown in FIG. 6B will immediately reach a value in excess of 8.0 volts. Such a situation will be encountered throughout virtually the entire first and second quadrants of the power line waveform $V_M$. Any power line failure in this range will cause an immediate negative transient value of the output voltage VO to be in excess of 8.0 volts. Although $v_3$ is a negative transient, it will be recalled that $v_4$ is produced through the inverter I2, as a result of which $v_4$ is the dominant positive waveform in the network. This will result in a voltage VT across resistor R3 in excess of the high range triggering level of 8.0 volts, and will cause the comparator C1 to output an out-of-high range condition. Because of the previously mentioned latching action in the comparator circuits, and for further reasons discussed below with respect to an intermediate situation, the latching condition on the output line LC will be maintained after the transient voltage $v_3$ has decayed with its characteristic time constant of 0.4 milliseconds, during which process comparator AC2 will trigger to an out-of-low range condition, to remain there until subsequent restoration of power line voltage.

There is, however, an intermediate situation when power failure occurs at a voltage slightly below 29 volts in the region immediately prior to the 180° point of the power line voltage $V_M$ of FIG. 6A. This will cause the negative transient in the voltage $v_3$ to just fail to reach the requisite 8.0 volt level to secure initial triggering of the high range comparator AC1. In such a case, a period of time must elapse for the transient to decay below the setting of the low range comparator. It will be appreciated, however, that the high range setting is 8.0 volts, and that the low range setting is 4.4 volts. Thus, a transient having an initial value of 8.0 volts, and characterized by a decay time of 0.4 milliseconds, will only require about 0.2 milliseconds to reach the lower triggering level of 4.4 volts. Thus, even in such intermediate cases, rapid triggering in the sub-millisecond range is achieved.

Furthermore, with respect to transients having an initial value in excess of 8.0 volts, the high range comparator AC1 will remain in a triggered state at least until the transient voltage decays to 8.0 volts, after which time it reverts to an untriggered state; however the output voltage of driver DR1 will remain in a low state for a significant period of time thereafter because of the previously mentioned offsetting of the thresholds of this Schmitt trigger circuit, further augmented by the 33 millisecond decay time of the holding network C2-R14. This time interval is more than sufficient to allow the voltage waveform to decay to the lower triggering value of 4.4 volts, thus maintaining the prerequisite output state on line LC.

Considering next power line failure in the third and fourth quadrants of FIG. 6A, here a positive transient is produced, and throughout most of this range it will be of sufficient value to markedly exceed the high range threshold of 8.0 volts. Here the voltage $v_3$ is the dominant positive voltage of the network, and appears across resistor R3 to trigger the high range comparator AC1. The low range comparator AC2 may momentarily trigger, but will remain in such a state for such a short time that drive DR2 is not latched. As before, an intermediate case will occur when the power line voltage fails immediately to the right of the 180° point of FIG. 6A. In the immediate region of this point, the positive transient will be insufficient to trigger the high range comparator AC1. Thereafter, as before, the low range comparator will not trigger until the transient has decayed to 4.4 volts. In the worst case, this will occur when the transient is just slightly below 8.0 volts, and as before, approximately 0.2 milliseconds will have to elapse until the low range comparator is triggered.

From the foregoing it will be seen that throughout all quadrants of the power line voltage the system will be triggered by power line failure to output an appropriate control signal condition on line LC characterized a response time in the submillisecond region. Not only are such total failures accurately and immediately sensed, but general out-of-range conditions are also sensed to produce a similar control signal condition, and intermediate transients of a pre-established duration are also similarly sensed.

Mention has been made in the Background of the Invention of one mode of power line failure that can cause massive damage to electrical equipment, namely, breakage of the neutral lead of the three-phase power distribution network, giving rise to a sudden in-phase rise of the power line voltage wave form. Such a situation is shown in FIG. 7A, wherein the dotted curve $V_M'$ is here taken to have a value twice the normal power line voltage $V_M$. If the breakage occurs in regions generally close to the power line voltage maxima, then this change will be reflected by an immediate change in the amplitudes of wave forms $v_1$ and $v_2$ of FIG. 3F, resulting in immediate detection of this condition.

If, on the other hand, this failure occurs at a axis crossing, as for example at the 180° point of FIG. 7A, the differentiating property of the network providing wave forms $v_3$ and $v_4$ will give rise to an abrupt increase in the composite wave form of FIG. 3F. This may be seen as follows. It will be recalled that the impedance of capacitor C1 is the dominant impedance in the network shown in FIGS. 5A-5B, causing the current through capacitor C1 to be approximately equal to the rate of change of the equivalent source voltage $V'$. As a result, the voltage developed across resistor R6 is generally proportional to this same rate of change. It is this differentiating property that gives rise to the phase shifted wave forms $v_3$ and $v_4$. In the event that the transition from normal power line voltage VM to the abnormally increased wave form VM', shown in FIG. 7A, occurs at, for example, 180°, then it is clear that the rate of change of the power line voltage has greatly increased in value. From the foregoing discussion, it will be evident that the voltage $v_4$ will undergo an immediate change as shown in FIG. 7A, triggering the high range comparator AC1. For illustrative purposes, the power line voltage has been assumed to undergo a doubling of its peak value, resulting in a virtually instantaneous doubling of the peak value of the wave form $v_4$. Similar considerations apply to the inverted wave form $v_3$, and the result is that if such a coherent power line voltage change occurs in the region of either of the axis crossings an out-of-range signal condition will be sent to the comparator AC1.

Thus, not only has provision been made for producing a control signal indicative of total power line failure at any time, but also provision has been made for producing a similar control signal condition in the event that the line voltage should drift between the acceptable limits of 100–130 volts r.m.s. Moreover, by use of phase-shifted waveforms superimposed upon unshifted waveforms, and by using a phase shifter characterized by very rapid response times, the desired rapid response to major power line transients and power line failures occurring at any time, and in particular during axis crossings, is achieved. These transients are readily detected to produce a reliable control signal which may be used to actuate the transition from line mode to battery mode in a standby power supply.

The previous discussion has been oriented with respect to energization of a standby power supply of the off-line" type, by which is meant an inverter which is in a dormant state as long as acceptable power line voltage conditions exist, and which is immediately activated to supply power to the associated load during periods of unacceptable line voltage abnormality. FIG. 8 shows the principles of the instant invention as applied to a power supply of the "on-line" type. By this is meant a battery operated inverter constantly supplying power to the associated load from a storage battery, the storage battery being continuously charged from the power lines. FIG. 8 shows in block schematic form the principal elements of such a power supply. A battery charger 1 is constantly connected to the input terminals T1, T2, and constantly supplies power to a storage battery and power supply 2, which in turn constantly powers an inverter 3. In normal operation, a single pole-double throw switch S1 is actuated by a fault detector and control circuit 4 to connect power output to the output terminals T3, T4. Power for the fault detector is provided by the storage battery and power supply 2. Here the fault detector and control circuit is connected directly to the output terminals T3, T4, i.e., to the inverter output, and its function is to sense inverter failure and to actuate switch 1 to connect the input terminals T1, T2 directly to the output terminals T3 and T4, responsively thereto.

The voltage abnormality detector previously described is fully applicable to such a system as shown in FIG. 9. Thus, it will be noted that provision should be made to insure that voltage developed between input terminals T1, T2 is within acceptable limits before commanding such reversion of switch S1. Also, a second voltage abnormality detection circuit may be connected across the input terminals T1, T2 to prevent a dangerous transition to direct power line voltage supply. This may be accomplished by a variety of means, as will be evident to those of ordinary skill in the art.

Finally, the principles of the instant invention may be applied to form a simple, relatively inexpensive quick-acting circuit breaker which does not supply an alternative source of power to the associated load, but which merely safely and rapidly disconnects the load from power lines in the event of dangerously high input voltage conditions. FIG. 9 is a block schematic diagram of the principal elements of such a circuit breaker. As before, input terminals T1 and T2 receive power from electrical power lines, and output terminals T3, T4 provide power to an associated load. Power supply 2 is connected across the output terminals T3, T4 to provide power to a fault detector and control circuit 1 connected across the output terminals.

As long as the output terminal voltage between terminals T3 and T4 is proper, the fault detector and control circuit actuates switch S1 interposed between terminals T1, T3 to a closed condition. A voltage abnormality of sufficient magnitude will cause the fault detector and control circuit 1 to operate switch S1 to an open condition, thereby interrupting power transfer. The circuit breaker system shown in FIG. 9 is initialized to a power-transferring condition by actuation of a manually operated momentary contact switch S2 bridging the terminals of switch S1. This energizes the power supply 2 and fault detector and control circuit 1 to actuate switch 1 to a closed condition and to maintain it there so long as the input line voltage remains within acceptable limit. To test whether or not the line voltage is within safe limits prior to closure of switch S2, a simple line voltage A.C. voltmeter M connected across terminals T1, T2 may be employed. Alternatively, a battery-powered additional fault detector and control circuit may be employed to restore operation automatically. For use with a circuit breaker which trips only in response to line overvoltage abnormalities, the fault detector circuit of FIG. 2 may be modified simply by removing the entire low-range detection circuitry branch from comparator AC2 to diode D6.

The foregoing discussion has dealt with the general approach of the present invention for detecting power line voltage abnormalities and for providing an output signal governing changeover between line and battery mode. There are, however, additional problems associated with employment of a fault detector of the type previously discussed, particularly as applied to an inverter having its output transformer permanently connected across the power supply output terminals T3,T4. Also, there are additional aspects of power line voltage variation, particularly in power distribution systems having poor regulation, which may be contended with at increased fault detector complexity and cost. Before considering these situations in more detail, a brief description of the overall aspects of the power supply of the present invention will be given.

Referring to FIG. 10, a pair of lines connect input power terminals T1,T2 to output power terminals T3,T4. A switching element S3 at the input serves as the master power switch. An additional switching element S1 in this same line is similarly interposed between the terminals T1 and T3 to break the power transfer between the input and output when a power line abnormality is sensed. As long as the power line voltage is within proper limits, a fault detector FD outputs a control signal to a phase detector and control circuit CC to maintain switch S1 in a closed condition. An oscillator OS, having a free-running frequency essentially equal to the power line frequency, is held in phase lock with respect to the input voltage applied to terminals T1 and T2. In the event of power line abnormality, the phase detector and control circuit CC acts on the oscillator OS to decouple it from the power lines so as to free-run at 60 Hertz. Nearly simultaneously, a signal from the phase detector and control circuit CC opens switch S1 and closes switch S4 to apply oscillator drive to a battery-powered switching inverter INV. The output transformer T of the inverter is permanently coupled across the output terminals T3,T4. Since the transformer is permanently connected across the output terminals, and since the oscillator OS was initially in phase lock with the input power line, upon closure of switch S4 the flux relationship in the output transformer T and the phase relationship with the oscillator OS are still properly synchronized, so that the switchover to battery power occurs without the generation of transformer transients, which could feed a spike into the load connected across T3,T4. Upon restoration of normal power to the input, switch S1 is again closed, and switch S4 is opened. Further with respect to the fault detector circuit of FIG. 2, provision may be made with respect to certain other instabilities if desired.

For purposes of consideration of such instabilities, FIG. 11 shows schematically a standby power supply PS powered from power lines having an internal line resistance RL, power being supplied by a power station generator G. The power supply PS is shown supplying power to a computer CM. Further, associated local loads across the power line are represented by a resistor RE. These problems which may be encountered may be summarized as follows:

(1) In those cases where the standby power supply has been operating in battery mode for a considerable period of time, the battery voltage will necessarily have dropped somewhat, resulting in a somewhat reduced voltage being supplied to power the computer CM. When the line voltage ultimately rises to proper limits, if the line resistance RL is sufficiently high, then upon a battery-to-line transition, a significant inrush current will be demanded by the computer CM, principally in the form of a short-term transient necessary to charge the filter capacitors of the internal power supply of the computer to a higher value. This inrush current will cause a short-term line drop in resistor RL, and may falsely trigger the system back to battery mode. With respect to fault detector shown in FIG. 2, a solution to this is to provide that when in battery mode the lower threshold is momentarily set to somewhat higher value, and when a line voltage is sensed which is compatible with this new threshold value, the comparators AC1,AC2 are momentarily disabled, and a control signal condition is produced on line LC of FIG. 10 to close switch Sl, a slight delay of the order of 40 milliseconds or so is instituted to cope with the transient inrush current time, whereafter the normal operating threshold VL is reestablished.

(2) A related problem, requiring a somewhat more complex solution, occurs when the main power switch S3 (FIG. 10) is first turned on. Here the inrush current is much higher, and unstable triggering of the low-voltage comparator AC2 may be expected. The solution is to provide that switch Sl will be normally open in the unpowered condition of the system. Upon closure of the main power switch S3, the lower threshold is raised and the upper threshold $V_u$ is lowered to provide a tighter acceptance range. A 150 millisecond delay is provided to allow comparators AC1, AC2 to establish a stable input. If the input voltage is acceptable, and it is therefore safe to deliver power to the computer CM, then switch Sl is closed to deliver power to the computer CM. As in the previous case, the comparators are then disabled for about 40 milliseconds to provide immunity against inrush current effect after which time the standard threshold values $V_L$ and $V_U$ are reestablished.

(3) It can frequently occur that the line voltage may move close to either of the threshold limits at various times during the day and cross them at intervals that are seconds or even minutes apart. It is desirable that a certain measure of immunity be provided, so that, once having entered battery mode, the system will remain in this mode until the line voltage is significantly farther away from either threshold limit. This is achieved by causing attendant to each line-to-battery transition the comparator threshold $v_u$ and $v_l$ both be moved towards each other and remain there until the line voltage once more enters this restricted range of threshold voltage before returning the system to line operation at the end.

(4) Again with reference to FIG. 11, if the line resistance RL is sufficiently large, and too low a line voltage is sensed, then a line-to-battery transition will occur. This effectively removes the computer CM from the power lines, with the result that the current demand flowing through line resistance RL is reduced, resulting in an immediate rise in the line voltage delivered to the fault detection circuit. This, being a sensing of adequate in-range line voltage, would have the effect of retriggering comparator C2 to actuate the system back to line operation. Clearly, an oscillatory situation would occur. The solution employed is to provide that, attendant to every line-to-battery transition, the low voltage threshold $v_1$ of FIG. 4 is raised and latched to a somewhat higher value. Thus, a substantial recovery of the line voltage up to proper operating limits must occur before comparator C2 will be retriggered to return the system to line operation.

Figure 14:
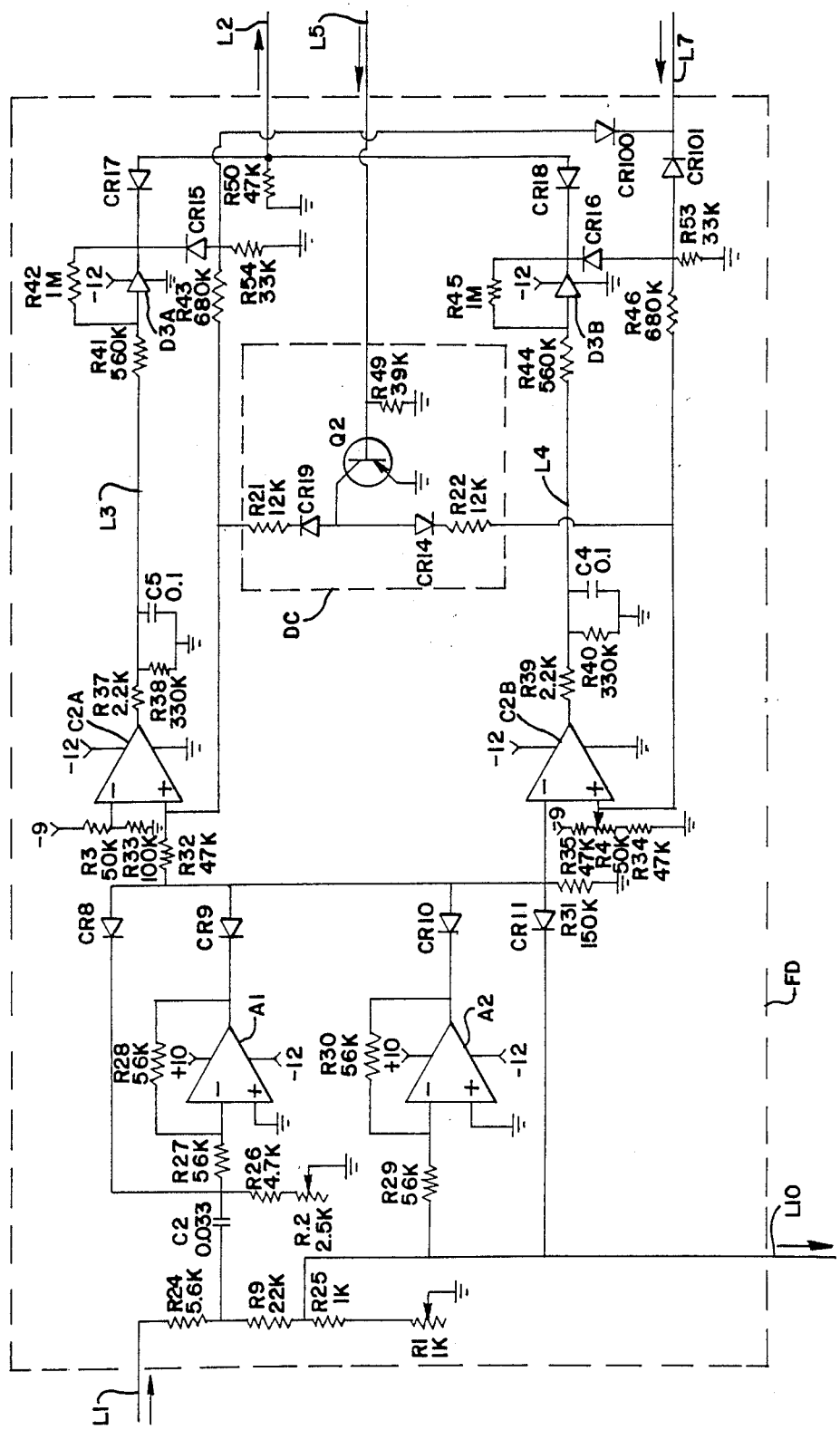
FIG. 14 shows the circuit of the fault detector of an advanced form of fault detector.

An example of a fault detector modified in view of the foregoing is shown in FIG. 14. In all of the following discussions, unless specific reference is made to FIGS. 1-13, element designation numbers will refer exclusively to FIGS. 14-31 Power line voltage from the power line is supplied via line L1. The independent attentuators R1,R2 and R4,R5 of FIG. 2 are now replaced by a composite attenuator fed from resistor R23 and consisting of the series string R24,R9,R25 and the variable resistor R1. The values are chosen to provide at the juncture of R9 and R25 an attenuated replica of the line voltage waveform reduced by a factor of approximately 30 to 1. This unshifted replica of the line voltage is then fed to a rectifier diode CR11 performing the same functions as diode D1 in FIG. 2. The particular system shown is designed to work with positive system power supply ground, and the polarity of diode CR11 is therefore reversed compared to diode D1. In all subsequent discussions of logic levels, the term "high" will refer to an essentially grounded condition, and "low" will mean strongly negative.

A summing resistor R31 serves the same purpose as resistor R3 in FIG. 2. Amplifier A1 (here taken to be type MC1458), having its non-inverting input connected through resistor R29 to the same junction in the input attenuator, has its output returned to the inverting input terminal through a resistor of identical value, so that amplifier A1 acts as a unity gain inverter performing a function identical to inverter Il in FIG. 2. Its output is similarly connected to the summing resistor R31 via the cathode of diode CR10.

To provide the phase-shifted half-waves to the summing resistor R31, a capacitor C2 is connected to the juncture between resistors R24 and R9 and to ground through resistor R26 and variable resistor R2. With the values shown, a phase shift of approximately 82-83 will be achieved across capacitor C2 at the power line frequency. The voltage developed at the output of capacitor C2 is coupled directly to the summing resistor R31 via the cathode of diode CR8, to provide current pulses corresponding to $V_3$ in FIG. 2. An inverting amplifier A2 provides via the cathode of diode CR9 current pulses corresponding to $V_4$ of FIG. 2 to the summing resistor R31.

The individual gain-adjusting resistors R1,R2 are used to set the magnitude of the current pulses delivered to resistor R31, as well as to render them equal in amplitude. The composite voltage waveform developed across resistor R31 is fed to a pair of amplitude comparators C2A,C2B serving the function generally similar to comparators AC1 and AC2 of FIG. 2. These comparators in the example shown are of the type LM339. Amplitude comparator C2A has its inverting input established by the setting of potentiometer R3 in series with resistor R33 to be established at a chosen voltage between approximately −6 and −9 volts. The non-inverting input of comparator C2A receives its signal from the summing resistor R31 via resistor R32. Comparator C2B has its inverting input reference potential established by the setting of resistor R4 in the biasing string R34,R4,R35, so that this terminal may be set at a reference potential ranging from 3 to 6 volts. Thus, the output of comparator C2A will undergo a transition from ground potential to −12 volts whenever the composite voltage developed across resistor R31 goes further negative below the level set by R3, and attenuator C2B will undergo a similar transition whenever the summing voltage goes less negative than the reference voltage level established by the setting of resistor R4.

FIG. 12 shows the voltage V31 developed across resistor R31 and having threshold values $v_x$ (maximum) and $v_n$ (minimum) of −7.5 and −4.2 volts respectively established at the comparators C2A and C2B. The waveform there shown is based upon an assumed 130 v.r.m.s. input on line L1 in the circuit of FIG. 14. Comparator C2A will undergo an output transition from ground to −12 volts if the peak voltage waveform V31 goes more strongly negative than −7.5 volts, and the output of comparator C2B will undergo a similar negative transition if the waveform V31 should drift upward in the figures to have any portion thereof extending above the −4.2 volt bias threshold line. Either of these transitions are relayed through drivers D3A,D3B to drive the anodes of diodes CR17 and CR18 strongly negative, thereby producing a negative (low) transition from ground at the common tie point of their cathodes to grounded resistor R50. This signal transition thus appears on the output line L2. Thus, the output line L2 will be driven strongly negative ("low") whenever an out-of-range condition is experienced. It will be noted that the time delay networks coupling the comparitor C2A, C2B and the positive feedback network around each driver D3, D3B perform similar functions to their counterpart elements in FIG. 2.

For reasons previously mentioned, each of the comparators C2A, C2B must have its threshold immediately reset to a more restrictive value when it is triggered by an out-of-range condition. These values are indicated in FIG. 12 as VX' and VN'. If the line voltage goes to high, thereby triggering comparator C2A, its threshold will immediately be reduced to a value of minus 6.8 volts as shown. Similarly, a low voltage abnormality will trigger comparator C2B, resulting in an immediate raising of its associated threshold to minus 4.9 volts. These settings correspond to input line voltage thresholds of 118 volts r.m.s. and 107 volts respectively. The triggering of either of these comparators result in a control signal condition on line L2 which causes the system to switch over to battery operation. The tighter threshold of triggered comparator will be maintained throughout battery operation until the line voltage return to a value within this tightened acceptance limit. As will subsequently be discussed, this action is controlled by a system control logic shown in FIG. 16.

Considering first the resetting of the threshold of the high range comparator C2A, it will be noted that its noninverting input is, in the absence of voltage developed across resistor R31, at ground potential. To secure the necessary shift in effective threshold level attendant to triggering of comparator C2A, the output of driver D3A is coupled to ground through the anode of diode CR15, having its cathode connected to ground through resistor R54. The juncture between these two elements is connected to resistor R43, which in turn is connected to the noninverting input.

When comparator C2A triggers, indicating unacceptably high line voltage on line L1, the anode of diode CR15 is pulled strongly negative, essentially connecting the ungrounded end of resistor R54 to −12 volts. The impedance driving the input end of resistor R32 from line L1 may be taken to be essentially zero. As a result, the −12 volt signal suddenly appearing across the attenuator consisting of the series elements R43,R32 is attenuated to provide at the noninverting input of comparator C2A a negative bias of approximately 0.7 volt.

This provides to comparator C2A a hysteresis effect similar to that provided around driver D3A, i.e., having triggered on an out-of-range line voltage condition on line L1, the effective retriggering threshold is reduced in magnitude by approximately 0.7 volt. The release threshold VX' of minus 6.8 is shown in FIG. 12. Until the maximum excursions of the wave-form V31 drop below this value in magnitude, i.e., upward in FIG. 12, the out-of-range condition will be maintained on output line L2, thus demanding that the standby power supply controlled thereby remain in battery mode.

With respect to the low-range sensing comparator C2B, a similar positive feedback is provided to the noninverting input via a similar network consisting of diode CR16, and resistors R53,R46. Here, however, the effect is essentially to add an additional 0.7 volts of bias to that already provided by resistor R4. Thus, in this case, having undergone a triggering occasioned by too low an input line voltage on line L1, reset will not occur until the line voltage has risen to place the waveform V31 to lie at all points below the threshold line VN, of −4.9 volts.

Two points should be noted with respect to the foregoing discussion of the comparators C2A,C2B. The reset of either comparator from an out-of-range condition to an in-range condition will result in a grounding condition being reestablished on line L3, thereby resetting lines L3,L4, resulting in a reset condition on the Schmitt trigger circuits using drivers D3A,D3B, and again restoring the diodes CR15,CR16 respectively to a blocking condition. Moreover, these operations are totally independent as between the two comparators C2A,C2B. If either comparator is triggered by a line voltage condition causing V31 to pass the normal limits of −4.2 and −7.5 volts, only that comparator which undergoes the transition will have its threshold reset.

A further feature provided which draws both of the thresholds VX and VN to their lower values VX' and VN' simultaneously. This control action provided only during initial start up of the system when the power switch S3 (FIG. 10) is first closed. By means which will subsequently be discussed, this double-narrowing of thresholds is achieved by pulling line L7 to a low state, thereby essentially grounding resistors R54 and R53 through diodes CR100, CR101.

The disabling circuit indicated by the dotted boundary DC is designed to incapacitate the action of comparators C2A, C2B and to place a high (in-range) condition on line L2 for a brief period of time attendant to every battery to line transition, and whenever the power is initially switched on via closure of switch S3 (FIG. 10). Thus, it will be noted that line L5 is driven low then transistor Q2 will be turned on, placing its collector at essentially at ground and thus establishing a nearly grounded condition at the noninverting inputs of both comparators C2A and C2B.

A general description of the basic elements of the power supply of the instant invention and their functions will now be given with particular reference to the general system block diagram shown in FIG. 15. A male line plug MLP is provided having three input pins, one pin HP for connection to the high side of the power lines, one pin RP to be connected to the return or low-voltage side of the power lines, and a grounding pin GP for connection to the household ground. It will be noted that pin GP is connected to chassis ground CG, by which is meant the metal housing of the entire power supply, whereas pin RP is connected to system ground SG, by which is meant the ground of the internal circuitry of the power supply. Similarly, there is provided an output female socket receptacle FS to deliver the high voltage line power to the connected load and having a grounding socket GS for connecting to the grounding pin of the load power plug, a return socket RS for connection to the return line pin of the load power plug through an overload detector OD, and a grounding pin socket GS.

The main power switch S1A serves to provide power to the entire power supply from the high voltage pin HP of the male line plug MLP. Line power is thus delivered from switch S1A via line L34 to a power switching system SS, delivering line power in the closed state via line 32 to the socket FS. A system control logic SCL provides general system control, and in particular operates the switching system SS between its two states via control lines L52 and L51. The fault detector FD protected by a surge suppression network SSN provides a line voltage abnormality indication to the system control logic SCL via line L2, and is in turn controlled therefrom to a temporarily disabled mode or to a narrower acceptance threshold range via lines L5, L7. An oscillator OS drives an inverter IN through an inverter control logic ICL. An axis crossing detector ACD receives attenuated power line voltage on line L10 via the fault detector FD to produce a pulse output which slaves the oscillator OSC to the power line via line L12, and also provides timing information to the system control logic SCL via line L12. Additional oscillator control is provided by the system control logic via line L14. The inverter control logic ICL is controllably disabled by the system control logic SCL via line L42 in line mode and provides control signal conditions via lines L20 and L42 in battery mode to provide modified square wave inverter output via lines L24, L26. As will subsequently be discussed, this timing operation in battery mode provides for a certain dead time between alternate half-wave cycles so that the output voltage supplied by the inverter INV in battery mode will provide a closer approximation to the average value/r.m.s. ratio of a sinusoid to the output socket FS. A transient suppression circuit TS is controlled by the system control logic line via L18 and the inverter control logic line L16 to throw a momentary transient-suppressing load across the inverter transformer T at appropriate times in the switching cycle in battery mode.

A power supply and battery charger PS takes input line power from line L34 to provide minus 12 volts power to the fault detector FD when in battery mode to maintain that unit in condition to sense return to proper line voltage conditions. This voltage is also supplied to run the axis crossing detector ACD and the oscillator OS. The oscillator OS in turn provides by a voltage doubler circuit the output thereof a positive 10 volts to the fault detector FD in this mode. The power supply PS also provides minus 9 volts from the minus 12 volts so supplied, and thus supplies power to the fault detector FD, the axis crossing detector ACD, the oscillator OS, the inverter control logic ICL, and a relevant part of the system control logic SCL. PS also supplies from the line voltage provided on line L34 a voltage of 25 volts to the power switching system SS to actuate it to a closed condition upon detection of normal line voltage after closure of the power switch S1A.

The power supply PS has an auxiliary portion which is transformerless. As will be discussed in more detail below, after closure of the power switch S1A, sufficient power is bled from the input high voltage line to charge certain energy-storage capacitors in the power supply circuit to provide power for a single power line interrogation cycle and at repeated intervals thereafter. It is desirable that transformers not be employed to power the power supply in such an initial interrogation mode, since there is always the possibility that a grossly high line voltage condition could blow fuses, the transformer, and associated circuitry. A substantial measure of cost economy is thus secured by doing periodic initial line voltage sensings, and effecting initial closure of the switching system SS after a successful interrogation by such a completely transformerless system. Also, the inverter transformer is never connected to the power line until a safe line voltage condition exists.

During operation in line mode the power supply is provided with approximately 25 volts from transformer T via lines L28, L30 to power the internal battery charger in the power supply, this battery in turn providing minus 18 volts to a portion of the power switching system PSS, the inverter control logic ICL, and the inverter IN.

POWER SUPPLY IN START-UP MODE

Figure 17:
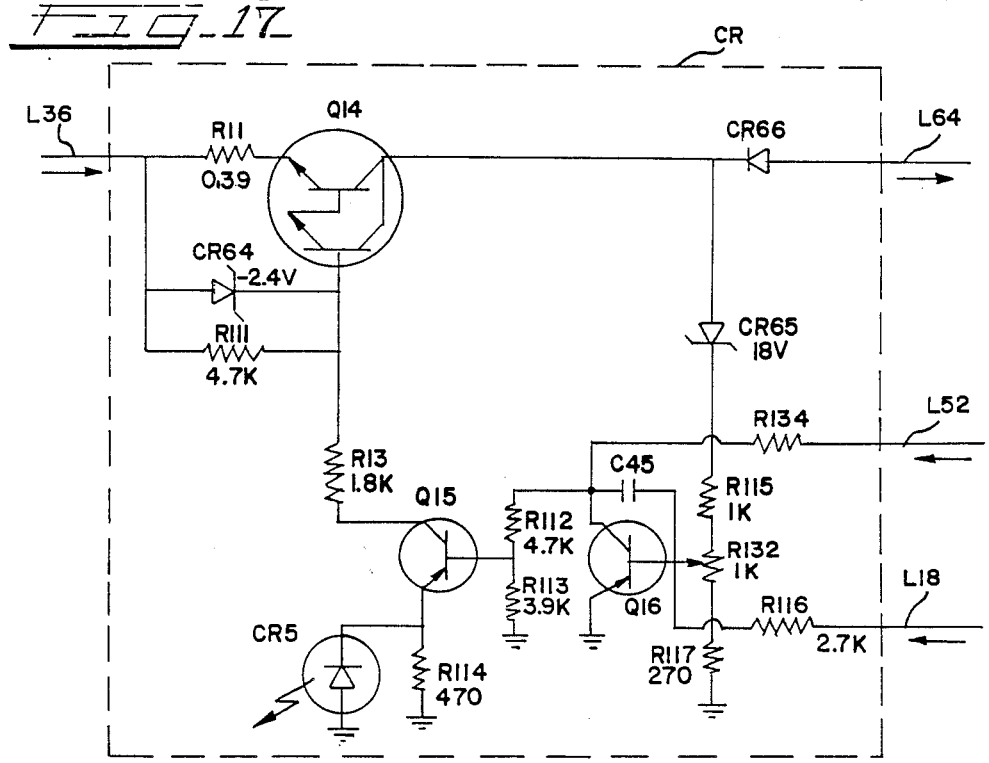
FIG. 17 shows the circuit of a charging regulator associated with a power supply/battery charger shown in FIG. 15.
Figure 18:
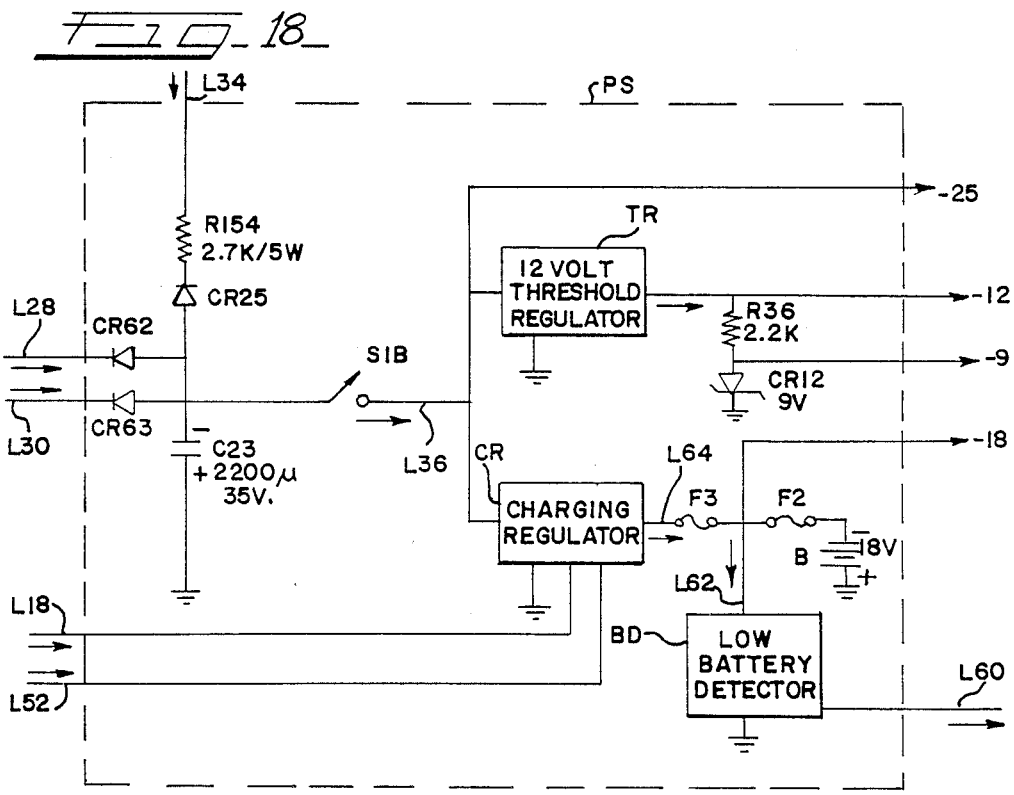
FIG. 18 shows the circuit diagram of the power supply.
Figure 22:
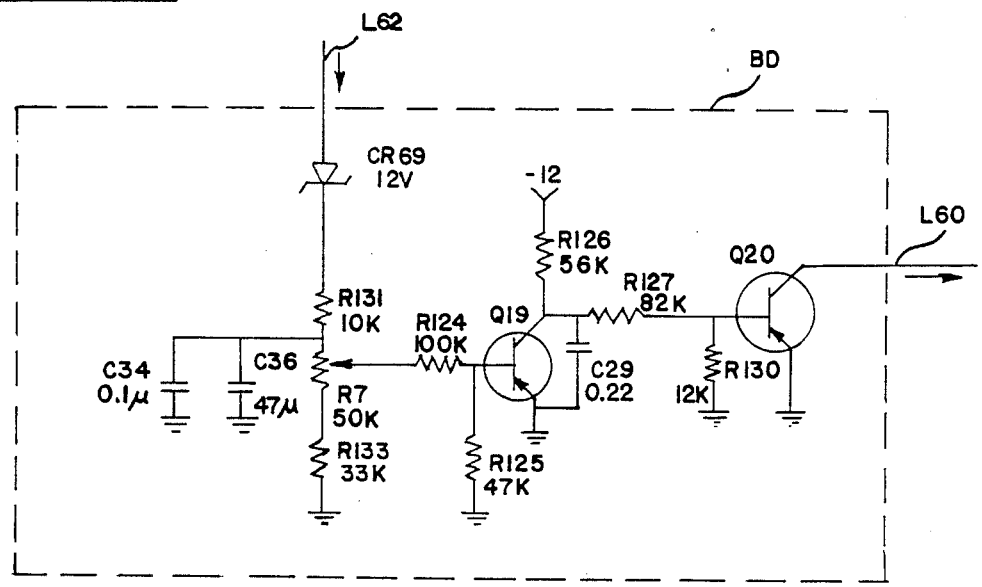
FIG. 22 shows the circuit diagram of a low battery detector associated with the power supply shown in FIG. 18.
Figure 23:
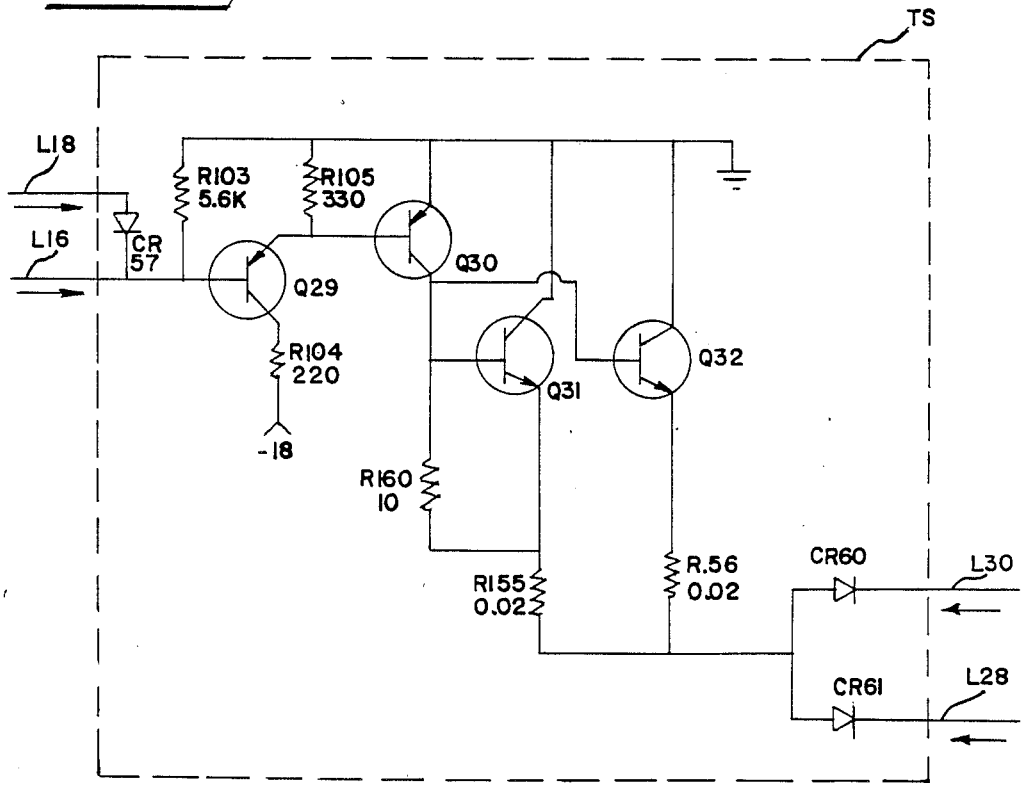
FIG. 23 shows the circuit of a transient suppressor shown in block diagram form in FIG. 15.

By far the most complex aspect of system functioning occurs during start-up mode when the main power switch S1A (FIG. 15) is closed. The principal interactions are between the power supply PS, the fault detector FD, the system control logic SCL and the switching system SS. FIG. 18 is a schematic diagram of the power supply PS, FIG. 19 is a circuit diagram of a threshold regulator TR of the power supply, FIG. 17 is a schematic diagram of a charging regulator CR, and FIG. 22 is a circuit diagram of a battery condition detector BD responsive to a low voltage condition in the storage battery of the power supply. Reference will also be made in this discussion to FIG. 14, the circuit for the fault detector FD First, it will be noted that in FIG. 15 a resistor R200 of approximate value 120 kilohms bridges the main power switch S1A at all times. Thus, with switch S1A open the surge suppression network SSN and the attenuator elements R24,R9,R25, and R1 set the initial voltage value on L34 to be approximately 27 volts r.m.s. We here assume a nominal value of approximately 6,000 ohms for the internal impedance of the surge suppression network SSN. Thus, before switch S1A is closed capacitor C23 of the power supply (FIG. 18) will be charged approximately to minus 25 volts through diode CR25, and capacitor C23 will always be in a charged state prior to closure of switch S1A. When switch S1A is closed to initiate the power-up cycle, switch S1B, mechanically connected thereto, will immediately deliver the voltage stored in capacitor C23 to a 12 volt threshold regulator TR (FIG. 19). This same voltage of minus 25 volts will also be delivered to the switching system SS (FIG. 13).

Referring briefly to the schematic of switching system SS, it will be noted that an immediate result of this will be to charge capacitor C21, having a much smaller value than C23, to essentially the same voltage. This circuit will be discussed in detail subsequently; however, for the moment it will be sufficient to recognize that power is available to turn on switching transistor Q8 responsively to an appropriately timed signal delivered thereto via line L52 to actuate the normally open relay K2 to a closed position. Relay K1 is normally closed.

Referring once again to the power supply circuit of FIG. 18, immediately upon closure of switch S1B the threshold regulator TR produces a regulated minus 12 volts and a regulated minus 9 volts to the appropriate elements of the system. Discussions of details of the charging regulator CR and low battery detector BD will be deferred.

Figure 16:
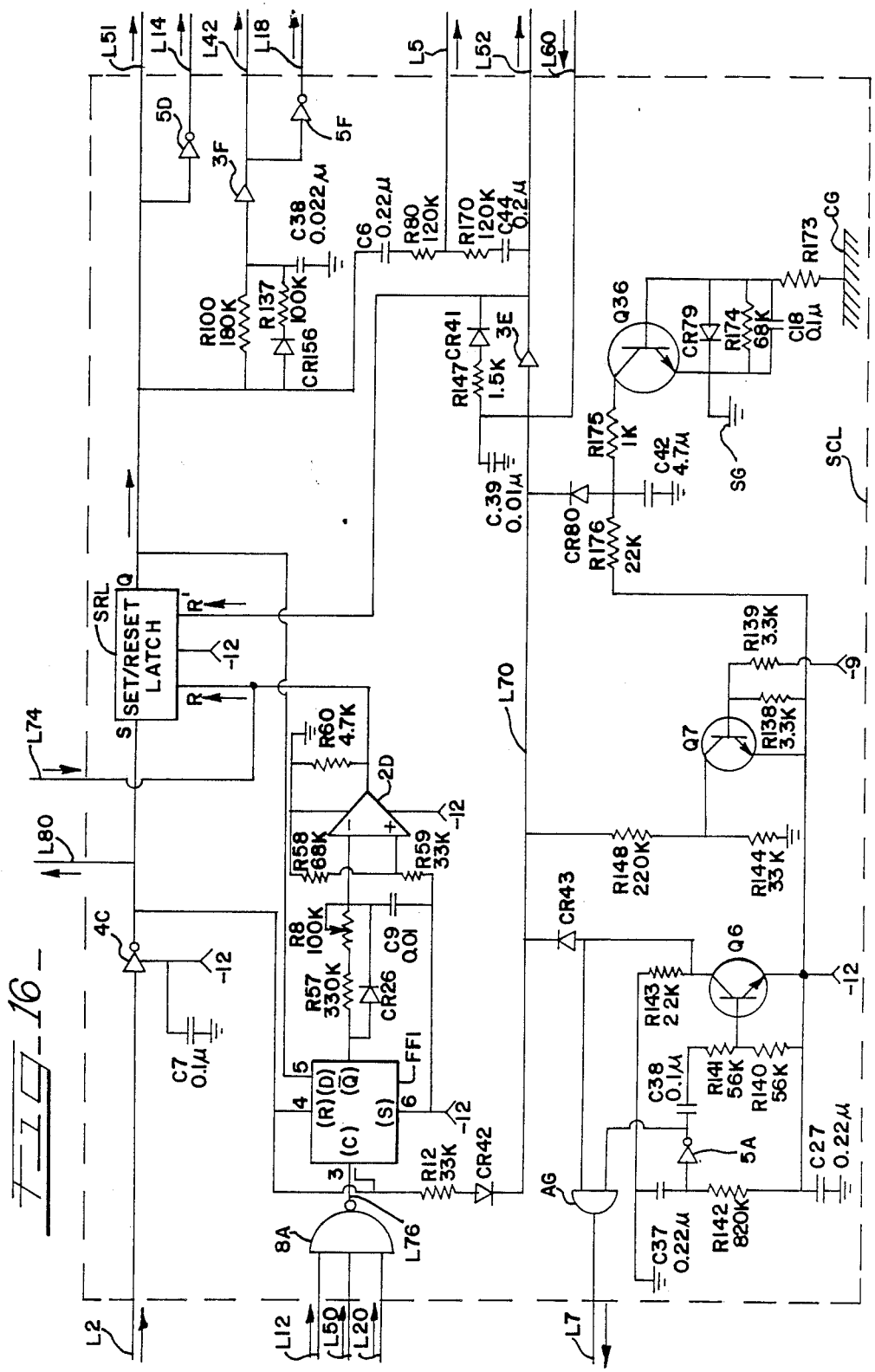
FIG. 16 shows the circuit of the system control logic shown in FIG. 15.

In the initial phase of the power start-up cycle the charging regulator CR is disabled. Referring briefly to the circuit of the inverter IN (FIG. 20), it will be noted that once the inverter is turned on approximately 25 volts AC will be delivered to maintain capacitor C23 of the power supply fully charged through rectifying diodes CR62, CR63. This, however, will not happen until the switching system SS is actuated to a closed condition. Thus, until this happens, during the initial portion of the power supply start-up cycle, capacitor C23 will bleed down very rapidly because of the current demands on the threshold regulator TR. As will subsequently be discussed, this regulator is of a latching-type, turning on at approximately 25 volts input, and maintaining regulation during the subsequent sagging of the voltage provided by capacitor C23 until this voltage drops to approximately 15 volts. At this time the output regulator transistor Q13 (FIG. 19) is immediately cut off, and the minus 12 volts supplied to other elements of the system will only be maintained for a very short period of time as set by the charge on output capacitor C25. This time is approximately 0.5 milliseconds. Resistor R36 of the power supply PS is chosen so that a regulated minus 9 volts will be maintained at the output during this collapse until the original minus 12 volts output of the threshold regulator TR drops to approximately 10 volts. The difference between these two voltages is used to govern the enabling and disabling of the system control logic SCL (FIG. 16).

The foregoing describes the beginning and terminal phases of the power supply searching cycle. As will be discussed, during this interval the system control logic SCL (FIG. 16) sets the fault detector FD (FIG. 14) to the previously mentioned narrow acceptance range with respect to line voltage by establishing a low condition on line L7. After a delay of approximately 100 milliseconds after closure of switches S1A and S1B, a single interrogation of the fault detector output line L2 is performed. This interrogation time lasts for approximately 25 milliseconds.

If an acceptable input line voltage condition is not detected in this interval, the interrogation period ceases, the switching system SS is not actuated to a closed condition, and the threshold regulator TS turns off. This time, however, the power switch S1A remains closed, and the capacitor C23, having sagged to 15 volts, is now relatively rapidly recharged through resistor R154, and once the voltage across C23 has been re-established at 25 volts the power supply start-up cycle once again initiates, accompanied by another interrogation of the fault detector. The details of how this is accomplished will next be discussed with particular reference to FIGS. 14, 15 and 16.

FAULT DETECTOR INTERROGATION CYCLE

Referring first to the system control logic circuit of FIG. 16, detection of a power line voltage within the narrowed acceptance range produces a high signal on line L2 from the fault detector FD. Line L70 of the system control logic SCL may be considered to be the master line of this particular circuit. A low (minus 12) signal condition on this line will, as will subsequently be shown, close the normally open relay K2 by a low signal condition on output line L52. As soon as the threshold regulator TR turns on, minus 12 and minus 9 volts are supplied to the system control logic SCL.

With specific reference to transistor Q7, this transistor element is immediately turned on, and attempts to pull line L7 low through resistor R148. As long as this transistor remains in the on condition it will attempt to actuate a relay closure signal on line L70. Such actuation, however, will be prevented by any one of three different signal conditions.

First, if an out-of-range (high) condition is present on fault detector line L2, inverter 4C and diode CR42 will act to prevent line L70 from going to a low state. Second, a one-shot pulser circuit based upon transistor Q6 will lock line L70 in a high state and will release it therefrom only during the previously mentioned 25 millisecond interrogation pulse initiated 100 milliseconds after power supply voltage is supplied to the system control logic SCL. Finally, a miswiring detector circuit based upon transistor Q36, and designed to sense voltage differences appearing between chassis ground CG and system ground SG will hold line L70 high in the event of an error in the household wiring. If the household wiring is proper, the circuit based upon Q36 will not place this latching action on line L70. Details of this circuit will be discussed subsequently.

Considering first the one-shot pulser circuit based on transistor Q6, immediately that minus 12 volts is supplied thereto, since capacitor C37 is initially uncharged, inverter 5A produces instantaneously a low output state. Capacitor C38 has no initial charge, and thus the low state is immediately relayed to the base of transistor Q6, and it remains in the off condition. Control line L7, which sets the fault detector FD to a restricted voltage acceptance range when low, outputs such a low signal state immediately because the output of inverter 5A is low. The other control line L5, which totally disables the fault detector when low, is held initially high because line L70 is held high. Actually, because of the network C6-R80, line L5 will go low for a period of 20 milliseconds or so, and then return to the high state. During this time, however, the delay circuit based on the transistor Q6 has yet to release the line L70, as a result of which this momentary disabling of the fault detector FD is of no significance.

Considering the delayed interrogation interval produced by the one-shot pulser circuit based upon resistor Q6, it will be seen that with the further passage of time capacitor C37 goes low, being charged through resistor R142. After approximately 100 milliseconds Q6 is then immediately turned on, back biasing diode CR43, and its action preventing actuation of line L70 to a low (relay turn-on) condition is released. Upon this transition, however the input to the other terminal of the AND gate AG, connected to the collector resistor Q6 is now low, and therefore line L7 remains low to maintain the restricted voltage acceptance range of fault detector FD.

Now, however, line 70 is fully released to respond to the fault detector signal L2, to remain there for the remainder interrogation cycle, which is set by the duration of the one-shot pulse. This is set by C38, R140, R141 and lasts 25 milliseconds. If, during this interval an in-range condition is sensed from line L2, the *high* condition is removed from line L70, and line L70 is pulled low in a time set by the value of capacitor C39 and resistor R148. Attendant to such a low condition on line L70, driver 3E is latched to maintain this state by resistor R147 and diode CR41, and will remain in this latched condition until the switch SlA is turned off, or until a dead battery situation is encountered.

In the event of failure to detect an acceptable line voltage condition in the 25 millisecond pulse interval, termination of the power supply cycle occurs by subsequent shutoff of the threshold regulator TR, at which time the minus 12 volt output thereof drops relatively rapidly. Referring to FIG. 16, recalling that regulation of the minus 9 volt supply is maintained during a significant initial portion of this collapse, when the minus 12 volts supply has dropped to approximately 10 volts or so, insufficient bias is applied to the base of transistor Q7 to maintain it in an on state, as a result of which it turns off, and no longer attempts to pull line L70 low.

This disabling is done because once the regulation of the minus 9 volt supply is lost, the threshold bias levels of the comparators C2A, C2B of the fault detector (FIG. 14) will proceed to drop, giving rise to the possibility of a false control signal condition output line L2, erroneously indicating and acceptable line voltage condition at that time. Turning off transistor Q7 before the 9 volt regulation is lost, its pulled down action on line L70 ends, and no spurious in-range signal condition can be placed on that line.

Immediately upon shutdown of the threshold regulator TR, the bleed-down of capacitor C23 is removed, and this element is free to charge again. Now, however, switch S1A is closed, and charging of capacitor C23 occurs very quickly. A new interrogation cycle is established in a relatively short time, and the foregoing procedure repeats itself.

It will be noted that attendant to such a series of power supply start-up cycles, the only allowed transition is the transition to line operation; operation into battery mode during the power-up interrogations is not allowed. Further, if, during an interrogation proper line voltage sensing is achieved, then the output of driver 3E having been driven low, a pulse of approximately 25 milliseconds duration is supplied to line L5 through resistor R178 and capacitor C44 to disable the fault detector via line L5 to provide 25 milliseconds of transient immunity to the fault detector during start-up of the system. Also, it will be noted that, attendant to the pulling of line L70 to a low state, AND gate AG (FIG. 16) is activated to produce a high state on line L7, thereby restoring the normal acceptance range of the fault detector FD.

The action of the set/reset latch SRL of the system control logic (FIG. 16) and its action on control lines L51, L14, L42, and L18 will now be briefly summarized for future reference when related subcircuits are discussed. During the initial power-up phase, it will be recalled that the output of driver 3E is initially high until a proper line voltage sensing is achieved, after which time it becomes permanently latched to a low state, to remain in this condition until the power supply is turned off. Reset terminal R' is positive state sensitive, as a result of which a low condition is placed at output terminal Q of the latch SRL. Subsequent receipt of proper line sensing will actuate the unit to line mode, permanently removing of this reset condition at terminal R, of the latch SRL. Once in line mode, the input control line L2 from the fault detector FD will be high, placing a low condition at the positive state sensitive set terminal S of the terminal SRL, and causing no change at the output terminal Q. Thus, the status of lines L51, L14, L42 and L18 both in startup and in initial line mode are governed by the low output state of terminal Q of the latch SRL. A subsequent out-of-range condition will cause line L2 to go low, thereby setting the latch SRL to place a high state on output line Q, thus changing the states of lines L51, L14, L42 and L18 to actuate the system to battery mode.

A subsequent in-range condition on line L2 will remove the set condition at the latch SRL, having no immediate effect at output terminal Q. A re-synchronization process thereafter will cause the positive state sensitive reset terminal R of the latch SRL to be driven high at a time when the power line voltage and the freely-running oscillator OS are momentarily in synchronism, this condition being detected by simultaneous high states on input lines L12, L50 and L20 so as to once more reset the latch SRL to place a low state at the output terminal thereof, again causing the control lines L51, L14, L42, and L18 to reverse their phase.

Briefly summarizing the functions of lines L51, L14, L42 and L18, line L51 controls the switching system SS to open relay contact K1 attendant to a transition from line-to-battery mode. Reversal of this condition closes relay contact K1 to reestablish line mode operation. Line L14 disables synchronization of the oscillator OS (FIG. 21) when low (battery mode) and enables oscillator synchronization when its phase reverses. Line L42 governs the inverter control logic ICL (FIG. 24), and in battery mode enables the outputs of the inverter control logic to drive the inverter (FIG. 20). This action is removed in line mode when a low state is placed on this line. Finally, line L18, when low (battery mode) enables a transient suppressor TS (FIG. 23), and disables this element when in a high state, i.e., in line mode, and also in startup mode.

With respect to line L5, this line disables the fault detector FD (FIG. 14) to cause it to output an in-range signal condition on output line L2. Output line L5 will thus be driven to a disabling condition for a temporary period of time of 30 milliseconds set by the values of resistor R170 and capacitor C44 when driver 3E of the system control logic is driven to its permanent latched low state responsively to a successful power line interrogation during start-up mode, also for a similar period of time whenever a high-to-low condition occurs at the latch SRL, i.e., during an initial short period of time during the battery-to-line transition, for reasons previously given.

Furthermore, the 119 Hertz pulses are also sent out on line L36 to cause the divider DV to produce 59.5 Hertz square waves on lines L20 and L22 which change state on the negative edge of the pulses on line L75. These pulses govern the phasing of switching drivers SD1, SD2 of the inverter IN (FIG. 20).

When the set-reset-latch SRL is latched in the high state (battery mode), resistors R100 and R137 in conjunction with capacitor C38 cause a positive transition delay of 0.8 milliseconds, which allows the relay K1 (which is actuated by line L51) to disconnect load power by opening the normally closed contacts before the inverter is activated by line L42.

When the set-reset-latch SRL is reset to a low state (line mode), resistor R100 and capacitor C38 cause a negative transition delay (diode CR156 is back biased) of about 3 milliseconds, which allows the inverter to continue operation during the period between the time that relay KCI is deenergized and relay contact K1 is reestablished to a contacting condition between the input and output terminals.

Figure 21:
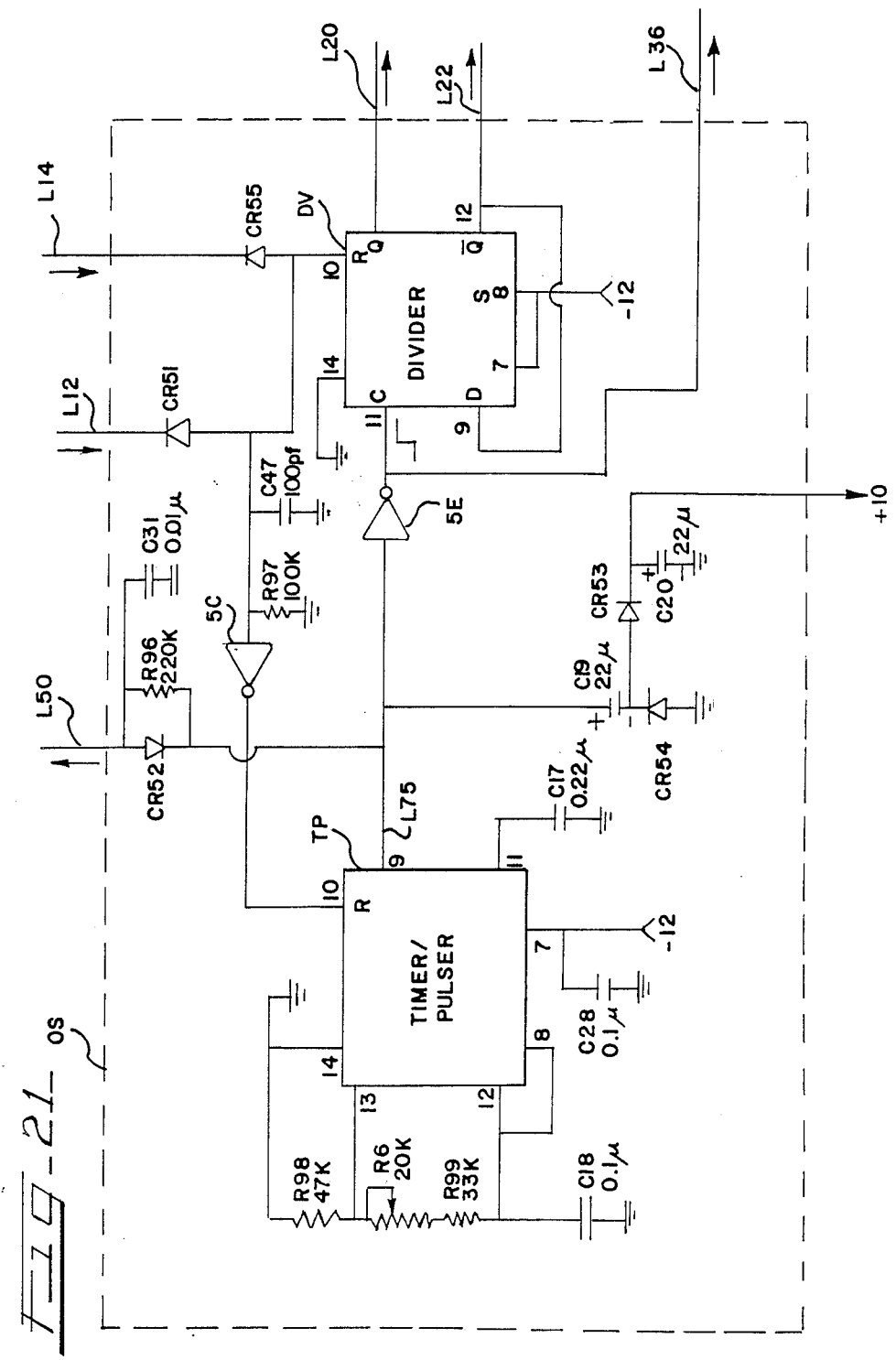
FIG. 21 shows the circuit of the oscillator shown in block diagram form in FIG. 15.

Finally, referring briefly to FIG. 21, the oscillator OS is established in a synchronously running state by short high pulses supplied by the axis crossing detector ACD (FIG. 30) on line L12 upon each negative-going power line voltage axis crossing. The purpose of control line L14 from the system control logic SCL is to disable the oscillator OS by a low state thereon. The oscillator OS contains two principal elements, namely a timer/pulser of representative type such as the type NE556C, and in freely running mode produces a rectangular output waveform at a frequency of preferably 119 Hertz as set by the values of capacitor C18 and resistors R6, R98, and R99. The timer pulser TP drives a two-to-one divider DV (type 4013) to provide an output square wave of alternating polarity on lines L20, L22 of precise 50—50 duty cycle. The additional details of the functioning of the subcircuits will be deferred until later.

Thus, once the system has completed the power-up phase the oscillator OS will be providing conditions on lines L20, L22, and L36 in synchronism with power line voltage.

LINE-TO-BATTERY MODE TRANSITION

For reasons largely related to cost economics the switching system SS (FIG. 2I) employs mechanical relays. Since there are delays in the response time of such relays, which are compensated for by the system control logic SCL (FIG. 16), the control circuitry of the switching system SS (FIG. 13) is best discussed at this time.

Relay contact K1 is of the normally closed type, such as the series type T90 made by Potter and Brumfield Corp. Relay contact K2, having an associated coil KC2 is of the normally open type, as for example the same series type made by Potter and Brumfield. Relay contact K1 is opened attendant to a line-to-battery transition by a low signal on line L51 from the system control logic SCL (FIG. 16), which will produce a low state on line L51 to command this transition, by means which will subsequently be discussed. In the absence of such a command signal condition, line L51 is held low, thereby holding transistor Q1 in a nonconducting transition. When this command signal transition is received, energy stored in capacitor C10 discharges through capacitor Q1 to energize coil KC1 to open relay contact K1.

For the mode under present consideration, namely the line-to-battery transition, it will be recalled that on power-up relay contact K2 was ultimately actuated to a closed condition. Also, it will be recalled that an in-range line signal condition on the fault detector output line L2 during the interrogation interval will initiate a relay turn-on signal on line L52 through the latching driver 3E and maintain the line L52 in a low condition thereafter. During this period capacitor C21 of the switching system SS is fully charged. Thus, during power-up, appearance of this low line condition on line L52 will cause transistor Q8 to be immediately turned on, whereupon the charge stored in capacitor C21 passes through the relay coil KC2 to pull the relay contact K2 closed to remain there until the main power switch S1A is opened, or until the storage battery goes dead. It will also be recalled that once line mode is established, the voltage of the transformer T of the inverter IN (FIG. 20) provided on lines L28, L30 will maintain capacitor C23 fully charged at approximately minus 25 volts to supply minus 18 volts via the power supply PS (FIG. 15) to maintain transistor Q8 in a conducting condition, thus maintaining relay contact K2 in a closed state.

It should be further noted that a resistive divider consisting of elements of R55, R56 on the load side of line L32, i.e., the load side of the switching system SS provides approximately 70 peak volts through diode CR24 to charge capacitor C10 to this value shortly after the power-on condition is established. When transistor Q1 is energized, capacitor C10 provides the current to the 5 volt relay coil KC1 far in excess of the normal 125 milliamperes necessary to actuate contact K1 to an open condition and the 100 milliampere hold-open current. This current pulse is approximately sixteen times the normally rated current of the relay coil KC1, and causes relay contact K1 to open significantly more rapidly than if the normal rated current were supplied to coil K1. This over-current condition last only temporarily, after which time the normal sustaining current of 100 milliamperes is provided from the minus 18 volt supply. During this latter period essentially no charging action is provided to capacitor C10 from the attenuator R55, R56, because the normal operating current passed through the relay coil KC1 and transistor Q1 is much larger than can be maintained through the relatively high resistance elements of the attenuator.

Figure 25:
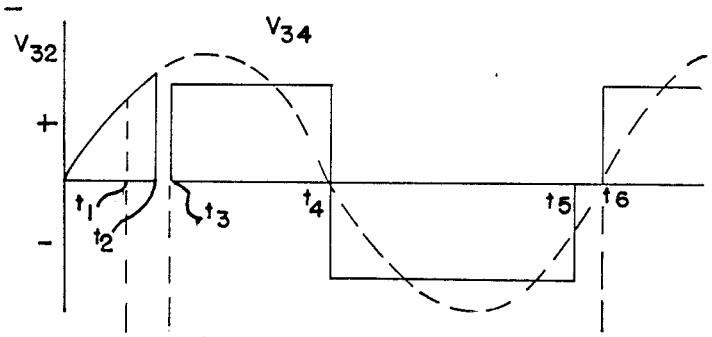
FIG. 25 shows input and output AC voltage waveforms of the power supply during a transition from line mode to battery mode.

The transition from line mode to battery mode occurs very rapidly, and may occur at any time attendant to receipt of a low condition on line L2 by the system control logic SCL (FIG. 15) from the fault detector FD (FIG. 14). FIG. 25 shows a general timing waveform for the line-to-battery transition initiated by receipt of such a fault detector signal condition at time $t_1$, here arbitrarily taken to occur in the first quadrant of the power line voltage $V_{34}$. FIG. 25 shows the behavior of the voltage delivered to the load by the switching system SS on output line L32. As has been discussed, this signal on line L2 causes line L51 of the system control logic to go to a high state, immediately energizing transistor Q1, to pull relay contact K1 to an open condition. Because of the known mechanical properties of the relay, this open circuit condition is not established until approximately 0.6 milliseconds have elapsed, giving rise to the open circuit condition indicated in FIG. 25 at time $t_2$. Internal timing in the system circuitry is adjusted so that the inverter IN is not actuated (by a high condition on line L41 from the system control logic SCL to the inverter control logic ICL until a time $t_3$ 0.8 milliseconds after $t_1$, so that inverter output pulses first appear on the output line L34 after 0.2 milliseconds of dead time as shown in FIG. 25. (The time intervals between $t_1$, $t_2$, and $t_3$ are drawn in exaggerated scale.)

Figure 27A:
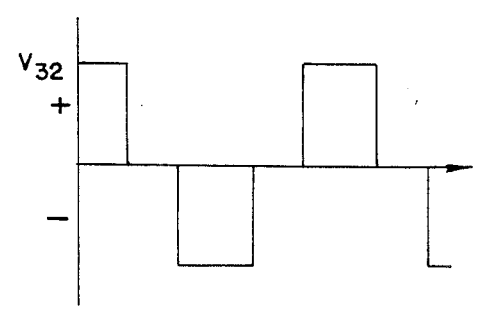
FIGS. 27a-27b show power output waveforms under high battery charge and low battery charge conditions, respectively.
Figure 27B:
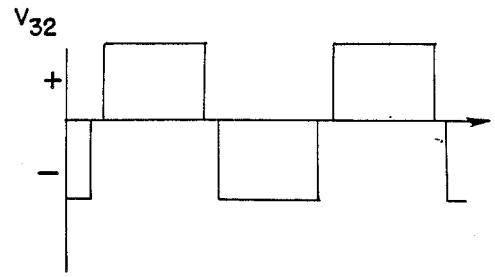

By this time oscillator OS is in a free-running condition because line L14 has been driven low, producing its first axis crossing at time $t_6$. Over the next several cycles the inverter control logic ICL governs the switching of the inverter, establishing dead periods as indicated by the time intervals $t_5$ and $t_6$ of generally increasing magnitude. FIG. 27A shows the output switching waveform corresponding to a high state of charge in the power supply battery B. A high state of battery charge gives rise to relatively large voltage amplitude pulses on line L32, and the dead times in between alternate positive and negative switching cycles are controllably introduced responsively to the inverter output voltage on line 32 as sensed by the inverter control logic ICL so as to adjust these intervals so as to approximate the proper ratio of out put waveform r.m.s. and half-wave average values. As the system battery discharges, the output voltage amplitude will drop, and the dead intervals will substantially disappear, as shown in FIG. 27B. Details of this action will be discussed subsequently.

Before considering the various timing sequence indicated in FIGS. 26A-26E, additional aspects of the system control logic (FIG. 15) must be discussed. It will be recalled that in power-up mode the output of driver 3E immediately places a high state on line L52. This condition is subsequently reversed during a successful interrogation cycle, whereafter driver 3E remains in a latched condition driving line L52 low. Considering the set/reset latch SRL, as long as line L52 is in this initial high condition, the reset terminal R, is maintained in a high condition, thereby holding the latched output on line L51 low. As a result of this, transistor Ql remains de-energized during this period, and relay Kl remains at its normally closed position. As soon as driver 3E latches in power-up mode, the reset condition is removed from terminal R, of the set/reset latch SRL and the latch is free to function to change the output state of line L51, and thus to control the relay contact Kl. Thus, in this state the line-to-battery transition will be commanded by an out-of-range low condition on line L2 setting the latch SRL to drive line L51 high to initiate the opening of relay contact Kl.

With respect to the remaining elements of the system control logic SCL not discussed thus far, elements 8A, IC7B and 2D are active only in the re-synchronization operation attendant to a battery-to-line operation. They are inoperative in line mode because in this mode the output of the latch SRL is low, reflecting this state at the data terminal D of the D flip-flop circuit IC7B. Thus the output terminal of this circuit is maintained high, as a result which the output of the comparator 2D is low, and there is no reset action transmitted to reset terminal R of the latch SRL.

Figure 24:
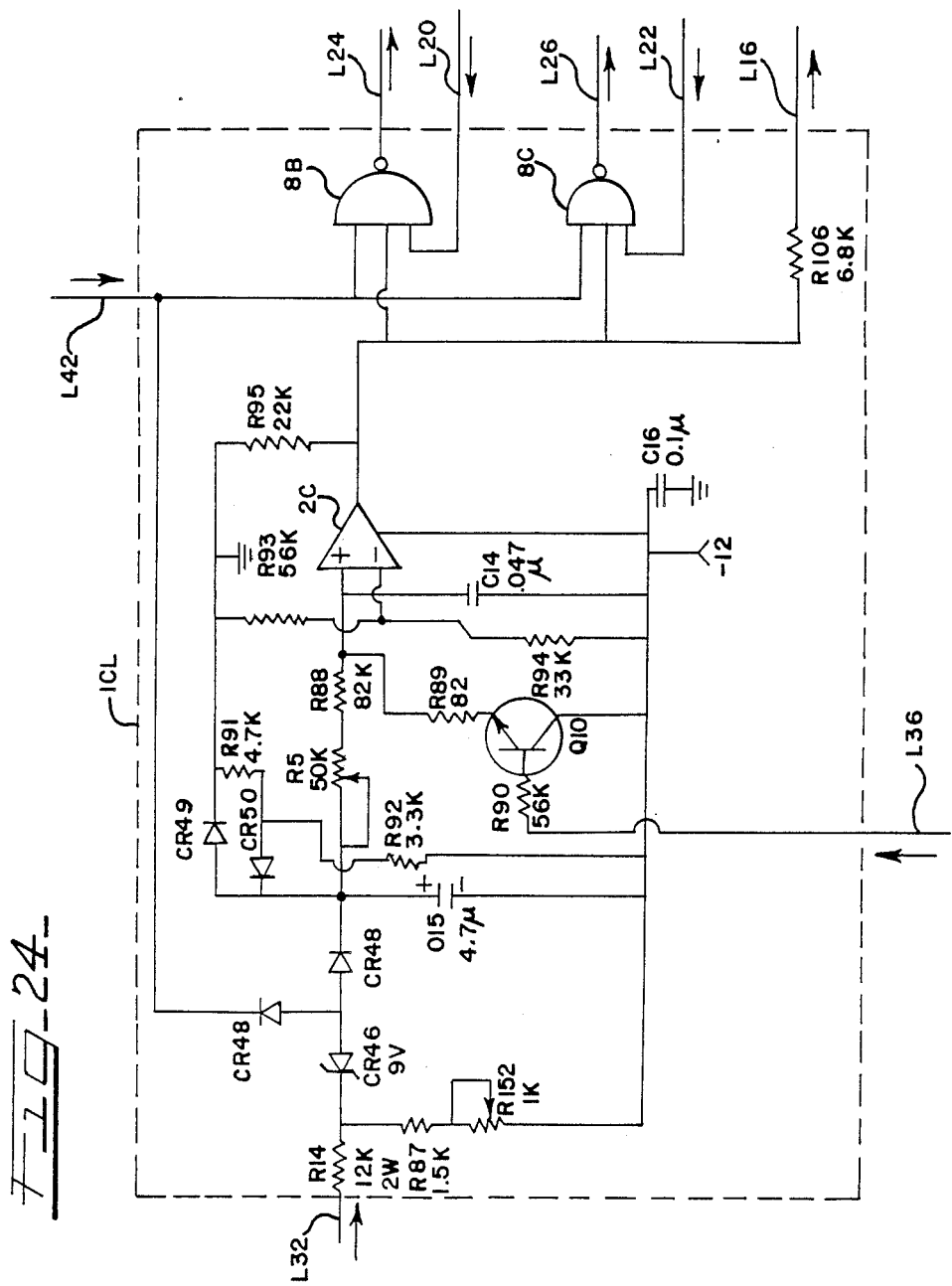
FIG. 24 shows the circuit of the inverter control logic shown in block diagram form in FIG. 15.

Thus, from the foregoing it will be seen that the out-of-range signal condition on line L2 of the system control logic sets the latch SRL to activate transistor Ql of the switching system SS to actuate the relay contact Kl to an open condition. Simultaneously with the appearance of this high condition on line L51, a low condition is established on line L14 through the action of inverter 5D. As previously discussed, driving line L14 low disables the synchronization of the oscillator OS, (FIG. 21) allowing it to free-run at 59.5 cycles. This same transition on line L51 acts to produce a delayed high state appearing approximately 800 microseconds later on line L42, and the inverse thereof on line L18. This control signal condition on line L18 disables the transient suppressor (FIG. 23), and the corresponding delayed control condition on line L42 acts to enable the phase-reversing NAND gates 8B, 8C of the inverter control logic ICL (FIG. 24). Until these gates are enabled, appropriate control pulses cannot be supplied to the switching drivers SD1, SD2 of the inverter INV (FIG. 20). Thus, the system control logic will not actuate these switching drivers to supply power until a delay of approximately 800 microseconds has elapsed after receipt of the fault detector out-of-range sensing. The phasing of the inverter control logic ICL (FIG. 24) is established the signal condition on line L36, which will be discussed in greater detail subsequently.

As previously mentioned, the progressive establishment of the dead times on the output waveform V32 (FIGS. 27a-27b) is established by an inverter output line voltage sensing delivered on line L32 to the inverter control logic ICL (FIG. 24). This condition is set by a charging process involving capacitor C15 and resistors R87, R152, and R14. The phasing of the switching inverter switching driver excitation signals from lines L24, L26 is established by lines L20, L22 from the oscillator OS cyclically energizing the NAND gates 8B, 8C. In particular, the first such transition after initial enabling of the inverter control logic ICL by line L42 occurs on the first subsequent transition of the oscillator OS, establishing the first axis crossing of the output wave form voltage V32 of FIG. 23.

FIGS. 26A-26E show waveforms on appropriate timing lines which govern the previously described sequence. At time $t_1$ an out-of-range low state is sensed on line L2 from the fault detector. The fault detector FD (FIG. 14) causes the set terminal of the latch SRL of the system control logic (FIG. 16) high, as previously described, placing a high state on the output terminal Q. Line L51 thus goes high to energize the relay coil KCl, initiating the opening of relay contact Kl. Line L14 similarly goes low to disable oscillator synchronization so that the oscillator OS (FIG. 21) goes into a freely running mode. This same transition at the output of a latch SRL is delayed in time by elements R100, R137, C38 by a time of approximately of 0.8 milliseconds, ultimately placing a high state on control line L42 at time $t_3$, thus enabling the inverter control logic (FIG. 24) to pass switching control pulses to the inverter INV (FIG. 20) on lines L24, L26. FIG. 26E shows the timing waveform on one of the oscillator output lines L20, showing initial oscillator synchronization with the power line voltage V34.

BATTERY-TO-LINE TRANSITION

The transition from battery to line operation is initiated by receipt of an in-range signal condition from the fault detector, i.e. a high state on line L2. Since the oscillator OS has been in a free-running condition, it will in general be out of phase with respect to the power line voltage at this time. The oscillator OS is allowed to free-run until a phase coherence is established by comparing a power line signal with the information provided by the axis crossing detector ACD. At this axis crossing the oscillator is slaved to a phase-locked condition, and the cycle which closes the relay contact KI immediately begins. FIG. 28 shows this power line voltage axis crossing at time $t_0$. Relay energizing transistor Ql (FIG. 13) is cut off at a predesignated time after this synchronizing axis crossing so that relay closure occurs shortly before the next axis crossing. For a 60 Hertz waveform this second axis crossing will occur 8.33 milliseconds after the first crossing. This predesignated time is chosen so that first contact occurs at a time $t_3$ 7.3 milliseconds after $t_0$. The inverter is cutoff at 7.1 milliseconds after $t_0$. Thus, any subsequent bouncing of the relay contacts to a momentarily open condition before final permanent closure is established occurs in the immediate vicinity of a power line axis crossing, and has negligible effect on the effective voltage delivered to the system load, since the system load power supplies must, in their very nature, be able to provide sustaining output during the low-voltage periods of the input sine wave.

Before the various system timing operations can be considered with respect to the battery-to-line transition, the behavior of the oscillator OS (FIG. 21) in a fully synchronized condition must be considered in more detail. In line operation the oscillator is synchronously driven; however, the inverter is not driven because of the action of the action of the inverter control logic ICL (FIG. 24). FIGS. 32, 33A-33D show the power line waveform and the waveform output of the axis crossing detector L12, the interior timing line L75 of the oscillator OS, output squarewave line L20 of the oscillator OS, and oscillator output control line L50 respectively. The timer/pulser TP (type NE556C) has a state-actuated reset R, and produces a 120 Hertz pulse train having pulses of approximately 3 milliseconds duration in the high state. This pulse train is inverted by the inverter 5E, and is fed to the positive edge-triggered clock terminal C of the divider (type 4013). The reset terminal R of this divider is positively state triggered. Whenever line L14 is held low via diode CR55, a reset condition can not appear at the divider. Similarly, this low state is relayed to the input of the inverter 5C to produce a constant high state at the reset terminal R of the timer/pulser, as a result of which both the timer/pulser and the divider are in a free-running state.

If, on the other hand, line L14 is high, then the appearance of a low state on line L12, i.e., during the 20 interval between the one millisecond pulses produced by the axis crossing detector at each negative-going axis crossing, and each such positive rise (FIG. 33A) will force the timer-pulser to immediately reset, thereby synchronizing the timer/pulser attendant to every negative-going axis crossing. Since the timer/pulser is set at a frequency below the power line frequency, an automatic locking condition is established without drift. Each high-to-low transition on line L75 is inverted and serves to trigger the clock of the divider, resulting in the 60 p.p.s. wavetrain shown in FIG. 33C.

Initially, attendant to every high transition on line L75 there will be delivered to the network R96, C31 a transition from the previous low state, charging capacitor C31 negative (low), the voltage across this capacitor then exponentially rising at a rate set by the values of elements R96, and C31. Referring momentarily to the system control logic (FIG. 16), this exponentially rising waveform will rise to a level sufficient to actuate the three input NAND gate 8A approximately 2 milliseconds after the onset of each high transition on line L75. Each low transition on line L75 will then immediately discharge the capacitor C31 through diode CR52. The effect of this exponential rise in waveform is shown in FIG. 33D, and the region at the terminal portion of this rise is shown as the effective gating time produced on line L50 with respect to gate 8A of the system control logic. The effective duration of the high state on line L50 is approximately one millisecond.

The phase relationships shown in FIGS. 32-33D are maintained so long as the oscillator is in synchronism with the power line. With respect to the decoupled condition (battery mode) wherein the oscillator OS run asynchronously, it should be realized that the waveforms on lines L20 and L50 will preserve the phase relationship shown therebetween, as this relationship is established uniquely by the internal transitions on line L75, irrespective of whether the oscillator OS is freely running or synchronously driven. Thus, in the asynchronous mode, the axis-crossing pulses L12 will remain locked with the line voltage V4, and the voltage pulse trains on lines L20, L50, L75 will travel together, and may be conceptually viewed as moving from left to right at a very slow rate, because of the very slightly lower free-running frequency of the oscillator OS. One final point should also be recognized here, namely, that with particular reference to gate 8A of the system control logic (FIG. 16) a small temporal overlap always exists between the high states on lines L20 and L50. It will also be noted that the trailing edge of the pulses on line L50 appear to be simultaneous with the rise on line L20. Actually, the discharge of capacitor C31 is virtually instantaneous, whereas there is a slight delay through the divider DV, as a result of which these alternate pulses on line L50 do not establish an overlapping high state with respect to the pulses on line L20, and these alternate pulses will therefore be ineffective in triggering gate 8A of the system control logic.

Considering now the various additional system timing operations in more detail as related to the battery-to-line transition, and referring particularly to FIGS. 29A-29E, it will be recalled that in battery mode the oscillator OS is free-running, and one of the threshold settings of the fault detector FD has been pulled inward as a result of the out-of-range signal condition which caused the original transition to battery mode. Upon return of the line voltage to a value within this restricted threshold setting, the fault detector FD (FIG. 14) outputs an in-range signal condition in the form of a high state on line L2, and immediately resets the affected threshold value to its normal setting. The oscillator OS (FIG. 21) continues in a free running condition because line L 14 has previously been driven low.

The system now proceeds to wait for synchronicity to be established between the negative axis crossing of the power line voltage V34 (FIG. 28) and the corresponding oscillator transition. The onset of this condition is detected by a combination of events on lines L12, L50 and L20 of the system control logic (FIG. 16).

It will be recalled with respect to the previous discussion of oscillator functioning, and in particular as shown in FIGS. 32-33D, that in the unsynchronized state the voltage trains appearing on lines L20 and L50 may be considered to move slowly as synchronously together from left to right with respect to the power line waveform V34 (FIG. 32) and the axis crossing detector pulse on line L12 (FIG. 33A). It will be further recalled that overlapping high states are established between lines L20 and L50 only attendant to transitions corresponding to negative-going axis crossings of the inverter waveform, this inverter waveform being governed by the transitions on line L20. Thus, it will be seen that pulse strains L20, L50 will slowly move to the right until an overlap is established with respect to the high states of the axis crossing pulses on line L12. At this point the oscillator and the power waveform are momentarily in phase, resulting in the appearance of a high state on line L76 of the system control logic SCL (FIG. 16). This fiducial pulse on line L76 initiates the transition from battery mode to line mode operation.

The immediate result of this transition on line L76 is to establish a low to high transition at the clock terminal C of the flip-flop FFI. It will be recalled that in battery mode the output of the latch SRL is high; thereby holding he data terminal D of the flip-flop FFI high, as a result of which the conjugate output terminal of the flip-flop FFI is driven low. This state is relayed to the inverting input of comparator 2D after a preset time delay set by the values of resistors R8, R57 and capacitor C9.

Potentiometer R8 of the system control logic is adjusted for a given relay Kl (FIG. 13) so that the comparator 2D resets the set/reset latch SRL to place output line L51 in a low state a nominally 3.9 milliseconds after the fiducial transition on line L76. After this delay, line L51 is driven to a low state, thereby turning off transistor Q1 to allow relay contact K1 to close at a nominal time 3.5 milliseconds later, i.e. at time $t_3$ on waveform diagram shown in FIG. 28. This will normally be followed by a very short rebounding period wherein contact is momentarily broken; however, positive final closure will occur at approximately 0.5 milliseconds after the next axis crossing, indicated at time $t_5$.

With reference to FIG. 29C the inverter enabling-/disabling line L42 will follow line L51 to a low state; however, this transition is delayed by the time constant set by resistor R100 and capacitor C38 of the system control logic (FIG. 16), so that line L42 drops to a low state to disable the inverter 3 milliseconds later than the drop of line L51. Thus, it will be seen that the inverter is shut off at time $t_3$ namely approximately 0.5 milliseconds before initial closure of the relay contact K1.

To guard against the upsetting effect of transients on the power line V34 during the battery-to-line transition, the fault detector FD (FIG. 14) is disabled by placing a low state on line L5 concurrently with the onset of the relay deactivation, i.e. from line L51. This is achieved through the differentiating network consisting of elements of resistor R80 and capacitor C6. Thus, line L5 will go immediately low with line L51 and will remain their for approximately 35 milliseconds, after which time it will sag once again upward to a high state to re-enable the fault detector FD. The system is now once again in line mode.

Inspection of the circuit for the power switching system SS (FIG. 13) shows that a breakover diode CR75 is connected across the relay coil KC1. The purpose of this diode is to cause rapid collapse of the magnetic field stored in the relay contact attendant to turning off transistor Q1. This means a much more positive and rapid return of the relay contact K1 to a closed state is achieved. This occurs as follows. When transistor Q1 is turned off, the large transient voltage will appear across the relay coil KC2 by inductive kickback. This voltage must be held to within certain safety limits as set by the emitter-collector breakdown voltage of transistor Q1. For such purposes customarily a simple damping diode, as represented by elements CR74, is normally employed, thereby maintaining the voltage surge across coil KC2 to approximately 0.7 volts. Such a drastic damping is, however, unnecessary and unduly delays the collapse of the field in the coil. This may be seen by considering the extreme limiting case of a dead short circuit placed across a coil with zero resistance, in which case whatever field is present will be completely trapped and unable to decay. It also follows from well-known principles that the rate of change of current through an inductor, and hence the rate of change of the field stored therein is, neglecting resistance effects, proportional to the instantaneous voltage developed across the inductor. Thus, by restricting the damping action to occur only at voltages in excess of 60 volts, namely the breakover voltage of the diode CR75, the rate of collapse in the coil KCI is greatly increased, resulting in much more rapid return of relay contact K1 to a closed condition.

DETAILED CONSIDERATION OF RELEVANT SUBCIRCUITS

The threshold regulator TR (FIGS. 19, 18) will now be considered in further detail. It will be recalled that this circuit will turn on if the voltage on line L36 builds to a value in excess of minus 24 volts, will maintain regulated output of minus 12 volts during a subsequent sag on line L36 down to minus 15 volts, at which time it abruptly shuts down. The operation of this system is best analyzed by considering the process wherein line L36 builds from zero to a steadily increasing negative value.

At minus 25 volts on this line, approximately 0.6 volts will appear across resistor R119 because of the voltage dividing action of resistors R118, R119 and R120. At this point transistor Q12 is turned slightly on and proceeds to leak a slight current through resistors R168 and 169, which is just enough to turn on transistor Q35 slightly. Thus, the current through resistor R170 adds to the current through R119, whereupon the process is augmented, resulting in virtually immediate turn on of transistor Q12 to a saturated condition. As a result of this, a full 12 volts is developed across the diode CR68, placing the base of transistor $Q_{13}$ at minus 12 volts. Transistor $Q_{13}$ is thus turned on. This is the regulating "on" condition of threshold regulator.

It will be recalled that during an interrogation cycle during the initial power-up operation of the system, the voltage on line L36 will subsequently sag. During such a sag, however, a new divider is active to control the bias to transistor Q12, namely the divider of resistors R119, R120 and R170, these latter two elements being essentially in parallel to ground. Also, there is approximately a 0.1 volt drop across resistor R118, so the voltage across resistor R119 must drop to below 0.5 volts for cut-off to occur. With this new division ratio, the voltage on line L36 will sag to minus 15 volts before transistor $Q_{12}$ cuts off, whereupon the base of transistor $Q_{13}$, leading to immediate cut-off of the minus 12 volts output of the threshold regulator.

The details of the charging regulator circuit of FIG. 17 will be discussed next, with collateral reference to FIG. 18. Two control lines govern the operation of this circuit. Line L18 from the system control logic has the action of turning off the regulator, i.e. disabling it. In the high state it has no effect whatever. Similarly, line L52, also from the control system logic, disables the charging regulator CR when in a high state, and enables it when in a low state. This occurs when line L52 is initially latched to all essentially permanent low state, closing the master relay K2.

This circuit is designed to deliver 20.7 volts to the battery B; however, the maximum current delivered is designed to be limited to 2.5 amperes to stay within the allowable charging range of the battery. Thus, if the battery is in a very low state, less than 20.7 volts will be delivered to the terminals thereof. Base current regulation of transistor Q14 sets the charging current.

Considering the voltage regulation aspects of the circuit, when 20.7 volts or more are delivered on line L64 battery, a voltage of 0.7 volts will occur across diode CR6, and thus 21.4 volts will be applied to diodes CR65. Resistor R132 is set to just turn on transistor Q16 at this point. As this transistor turns on, it starts to turn off transistor Q15, as a result of which the base current in transistor Q14 begins to be somewhat starved, i.e. the higher line L64 goes, the more the base of transistor Q14 is thus starved. This provides the voltage regulation aspect of the circuit.

With respect to current regulation, assume that a low battery condition exists, setting the voltage on line L64 at less than 20.7 volts. For reasons set forth above, transistor Q16 will be turned off, as a result of which transistor Q15 is fully on and a strong current flows into diode CR64, this element having a breakdown voltage of 2.4 volts. The overall base-emitter junction of the composite transistor Q14 has a drop of 1.4 volts, and a voltage of one volt is developed across R11, corresponding to 2.5 amps. Any attempt to draw additional current out of this system via line L64 immediately results in a debiasing action because of resistor R11, as a result of which a constant current regulation action is effected by this circuit.

Considering next the battery detector BD shown in detail in FIG. 22, and schematically in FIG. 18 the purpose of this circuit is to shut down the entire system when the battery voltage delivered via line L62 drops below 13.8 volts. At 13.8 volts input on this line, diode CR69 removes approximately 11.5 volts therefrom, and potentiometer R7 is set to provide 0.65 volts to the base of transistor Q19 through the voltage divider R124, R125. Thus, if the voltage on line L62 drops below 13.8 volts, transistor Q19 is turned off, turning transistor Q20 on. As a result of this, line L60 is grounded, i.e. to a high state. With reference to the system control logic shown in FIG. 16, setting line L60 high unlatches driver 3E, driving line L52 high. Referring now to FIG. 13, it will be noted that as a result of a high state on line L52 relay coil KC2 will de-energize, thus opening relay contact K2, and shutting the entire system down. After such an occurrence, the power-up cycle must be reinitiated to bring the system back into line mode, after which time recharging of the battery will occur.

Figure 15:
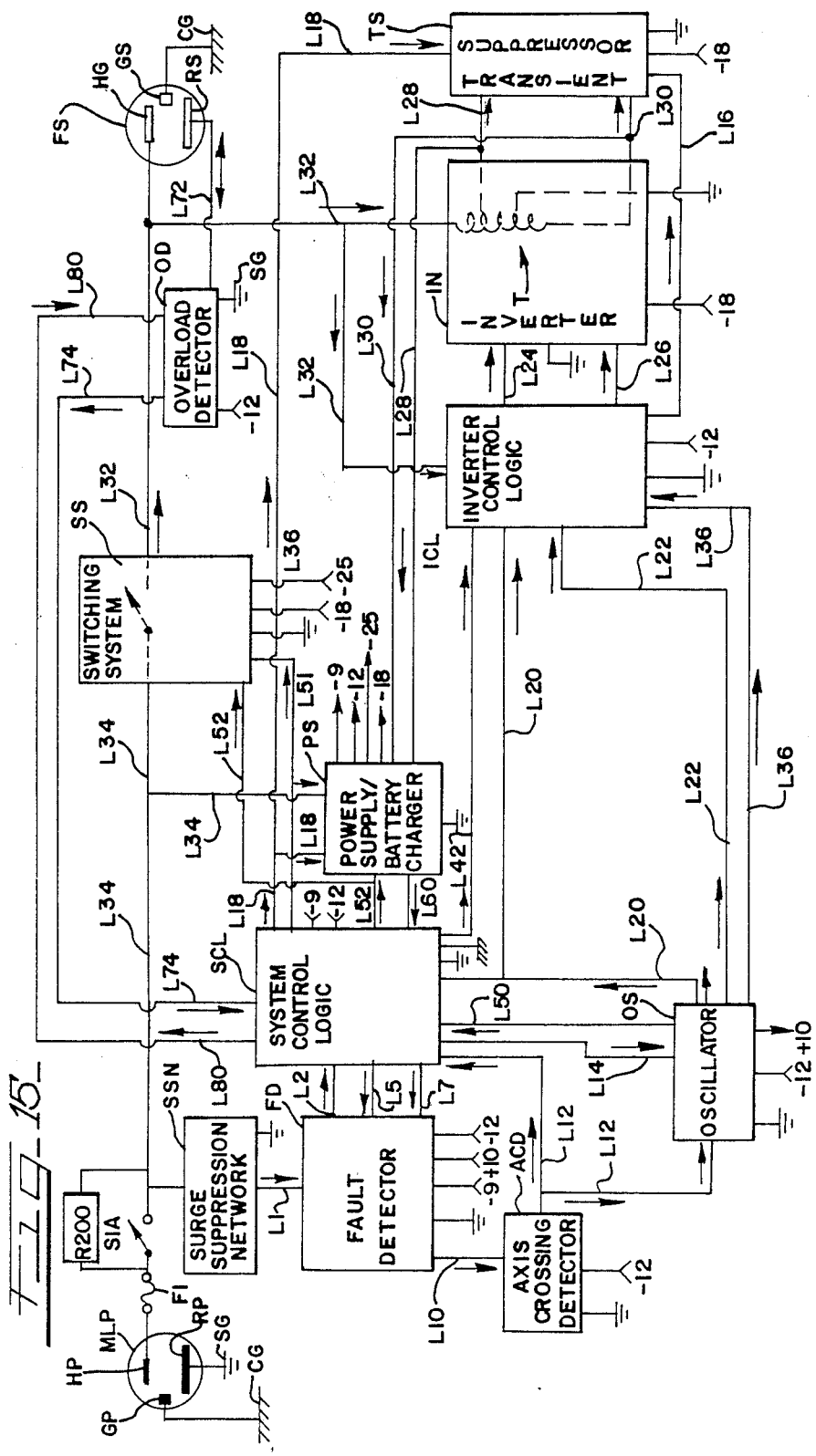
FIG. 15 shows the general elements of the power supply of the present invention in block diagram form.

Considering next the overload detector OD, shown in detail in FIG. 31, and in block schematic form in the general system diagram of FIG. 15, the major function of this circuit is to prevent actuation of the system to inverter mode in the event that an excessive load has been connected to the output. This provides a basic safety feature to prevent burning out of the inverter circuitry. Its action is governed by sensing of the current supply to the load when in line mode, and to use this sensing to disable the line-to-battery transition in the event that total system loading in line mode exceeds a given value. Additionally, a warning is provided to the operator when in line mode to warn him that battery backup will be unavailable. He is thus warned to remove the excessive nonessential loads from the output before such transition is required. The control action of the detector OD is to drive line L74 to a high state if excessive loads are connected to the system output. Such an action will reset the set/reset latch SRL of the system control logic of FIG. 16. Such an action will immediately shut off the inverter by placing it in a low state on line L42, thereby disabling the three-input NAND gates 8B, 8C of the inverter control logic in FIG. 24. A reset action is provided via input line L80, which unlatches this high state on line L74 when it is driven low.

In more detail, the circuit operates as follows. The load current is passed through resistor R65 to system ground from line L72. If more than 0.7 peak volts are developed across R65, then transistor Q9 immediately starts to pulse on negative peaks. As a result of this, the collector of transistor of Q9 is periodically grounded, and driver 3D is immediately latched to put a high state on line L74, this latching action being provided by resistor R70.

This latching condition will be maintained until two conditions occur. First, the overload condition must be removed, resulting in negligible voltage being developed across resistor R65, and also a normal line condition must be sensed by the fault detector. Under such conditions, referring to the system control logic (FIG. 16), line L80 will be in a low state, which will result in an immediate reset of the latched state of driver 3D, provided that the overload condition has been removed.

To provide the necessary warning to the operator, the latched condition of driver 3D, indicative of overload, is also used to actuate an alarm A taking a variety of well-known forms.

Considering next the axis crossing detector ACD (FIG. 30), it will be recalled that the purpose of the circuit is to produce a short high pulse beginning at each negative-going axis crossing of the input line voltage. An attenuated replica of this voltage is supplied on line L10, thereby turning on transistor Q5 during the third and fourth quadrants of power line waveform. Turning transistor Q5 on thus places a high state at the input of driver 9A. Thus, attendant to each negative-going axis crossing of the power line waveform inverters 9A, 9B are driven to a temporarily latched condition to remain there for approximately 14 milliseconds until a network R160, C51 bleeds down to release this condition. The result of this is that attendant to each negative axis crossing the latching condition is established which will be immune to noise on the power line input thereafter. The onset of the output pulse produced by inverter 9B is then fed through a similar one-shot latch consisting of inverters 9C, 9D having a positive feedback register R159 connected around them. The time constant of the coupling network C53, R103 is set to be approximately 800 microseconds, as a result of which an 800 microsecond high state is placed on output line L12 attendant to each negative-going axis crossing.

Considering next the line wiring error detector based upon transistor Q36 of the system control logic (FIG. 16), it will be recalled that master line L70 must be pulled low to turn the system on during the power-up cycle. The purpose of the wiring error protection circuit is to insure that line L70 cannot thus be pulled low if an error has been made in the household wiring such that the power return line and the neutral ground line have been interchanged. If such is the case, than chassis grounds CG and signal ground SG (see also FIG. 15) will assume different electrical potentials. In the absence of such a potential difference between signal and chassis ground, no voltage difference will be supplied between the emitter and the base of transistor Q36. Its collector will then float, and no action will be transferred therefrom to line L70. If, on the other hand, such miswiring has occurred and such voltage potential exists, then the voltage divider comprised of R173 and R174 will cause Q36 to be turned on, thereby pinning the right-hand end of resistor R175 at minus 0.6 volts. The anode of diode CR80 is thus essentially high, and line L70 cannot be driven low. The desired safety feature is thus provided.

Considering the inverter control logic ICL (FIG. 24), this circuit receives timing information from the oscillator OS of FIG. 21 in the form of short pulses tc a low state at a 120 pulse per second rate. Additionally, a disabling signal from the system control logic via line L42 (see FIG. 15) disables the output whenever this line is held low. Further sensing information in the form of the inverter output wave form is provided from the inverter output line L 32. The inverter control logic produces high and low states appropriately timed on lines L24, L26 to actuate the system switching drivers SD1, SD2 of the inverter (FIG. 19). Additionally, the inverter control logic drives output control line L16 low to provide the previously mentioned dead intervals of the inverter output waveform shown in FIGS. 27a and 27b. As previously mentioned, these intervals are established in response to the sensing inverter output voltage on line L32. A constant high condition on that line will cause the inverter to produce a square wave at the output, without dead times.

Considering the circuit of the inverter control logic ICL (FIG. 24) in more detail, it will be recalled the purpose of this circuit is to govern the actuation of the switching drivers SDI, SD2 in such a way as to provide the relatively long dead times in the inverter waveform as shown in FIG. 27A in case of a high battery condition when operating in battery mode. The square wave pulses from the oscillator OS are delivered via lines L20, L22 to three-input NAND 8B, 8C, respectively. Actuation of these gates to a conducting condition will cause the respective energization of output lines L24, L26. Input control line L42 from the system control logic (FIG. 16) is, as previously discussed, held low in start-up and in line mode, thereby preventing actuation of the inverter.

When in battery mode this line is held high, and the creation of appropriate dead times attendant to waveform axis crossing so the inverter waveform established by inverter voltage output sensing taken from the transformer of the inverter INV via line L32. Synchronization of waveform switching is governed by the 120 p.p.s. short duration high pulses delivered from the oscillator 0S (FIG. 21) to the inverter control logic ICL by line L36. These are negative pulses of short duration produced attendant to each 120 p.p.s. clocking pulse delivered to the clock terminal of the divider DV of the oscillator OS, and thus, are in synchronism the transition on lines L20 and L22. The purpose of this circuitry associated with the transistor Q10 and comparator 2C is to provide variable-width low disabling pulses to the gates 8D, 8C synchronously with the onset of each 120 p.p.s. pulse received from line L36, and to control the duration of this disabling for a period of time set by the amplitude of the inverter output voltage as sensed on L32.

For a fully charged battery, resulting in a relatively high peak amplitude delivered to line L32, these disabling pulses will in general be relatively wide, resulting in an inverter waveform of the form shown in FIG. 27A. As the battery slowly looses voltage, this circuitry will reduce the duration of these disabling pulses correspondingly. Furthermore, the response time of the circuitry of the inverter control logic ICL is established so that upon line-to-battery transition, as shown in FIG. 25, these dead times will gradually build in value, requiring several cycles to reach steady state.

The inverting input of comparator 2C is biased on a nominal −8 volts by the divider string R93, R94. Capacitor C14, connected to the inverting input, is effectively short to ground by the onset of each high pulse from line L36. Transistor Q10 is actually operated in the inverse mode, wherein the functions of emitter and collector are reversed, so as to provide an extremely low saturation value for maximum discharging of capacitor C14. Upon the disappearance of each of these short high pulses on line L36, transistor Q10 is opened. A suitably attenuated replica of the inverter output voltage is provided to charge capacitor C15 so that the higher the peak inverter output voltage, the greater the voltage will be on this element. Upon each turnoff of each transistor Q10 a charge transfer occurs from capacitor C15 to charge capacitor C14 through resistors R5, R88. The charging rate of capacitor C14 will thus also be set by the voltage present on capacitor C15. When the voltage developed across capacitor C14 has reached approximately 8 volts, any output transistor of comparator 2C being of the open-collector type, turns on to pull the output of comparator 2C low, thereby disabling gates 8B, 8C until the next pulse arrives on line L36 to initiate the process again. The basic waveform control action is thus effectively terminate the trailing edges of the squarewave in waveforms received on line L20, L22 from the oscillator OS. The higher the inverter output voltage, the greater will be the voltage stored in capacitor C15 and the more rapidly this termination will occur, resulting in inverter control waveform on lines L24, L26 giving rise to significant dead times in the inverter output voltage as shown in FIG. 27A. As the battery voltage slowly drops, it is equally clear that these premature terminations will occur progressively later times, resulting in the inverter output waveform spreadout as shown in FIG. 27B. Moreover, it is equally clear that upon first line-to-battery transition, as shown in FIG. 25, that, there being no initial charge on capacitor C15, several half-cycles must elapse before steady-state conditions are established on capacitor C15, during which interval these premature terminations proceed to build in magnitude as indicated in FIG. 25, and as previously discussed. The time constant regulating this initial charging is essentially that of resistors R87, R152 and capacitor C15, the time constant of these elements yielding a value of 10 milliseconds, i.e., a little more than one-half cycle of the power line waveform. Replicas of these low disabling pulses which govern the premature termination of the inverter excitation are also provided to line L16 to govern the transient suppressor TS shown in FIG. 23.

Considering the transient suppressor in more detail, attendant to each such low condition on line L16 a shorting condition is placed upon lines L30, L28 coming from the transformer of inverter INV (FIG. 20) so as to damp inductive transients from the transformer attendant to driver switching. This action only occurs in battery mode, since disabling line L18 from the system control logic is, as previously discussed, held high in start up and line mode. During battery operation, however, line L18 is low and its holding action on input line L16 is removed. Accordingly, attendant to each low state pulse on line L16, transistor Q29 is energized, in turn energizing a transistor Q30, this transistor in turn energizing transistors Q31, Q32 during the dead interval, thus effectively grounding the anodes of diode CR60, CR61 so as to damp the attendant inverter transformer transients. The purpose of resistor R160 is to ensure that transistors Q31 and Q32 turn off reliably in the event that transistor Q30 has high collector leakage.

It is intended that broad claims not specifying details of a particular embodiment disclosed herein as the best mode contemplated for carrying out the invention should not be limited to such details. Further while specific claimed details of the invention generally constitute important specific aspects of the invention, in appropriate instances even the specific claims involved should be construed in light of the doctrine of equivalents. Thus, many of the features as described herein as applied to an intermittently driven power supply may equally well be applied to continuously driven supplies wherein a battery charger is intermittently disconnected from a storage battery attendant to line voltage abnormalities, and to general device protection circuits for insertion between a power line and an accessory load of any kind.

I claim:

1. A power supply for providing electrical power to a load in case of power line voltage failure comprising:
   input terminal means adapted for connection to electrical power lines;
   load terminal means adapted for connection to said load;
   battery-operated inverter means for providing electrical power to said load terminal means;
   fault detector means responsively coupled to said input terminal means for producing a low-voltage-indicating condition responsively to the presence of a power line voltage having an amplitude below a given valve and for producing a normal-voltage-indicating condition responsively to the presence of a power line voltage having an amplitude above said given value;
   control switching means responsively coupled to said fault detector and operable to a line-power state responsively to the presence of said normal-voltage-indicating condition and to a battery-power state responsively to the presence of said low-voltage-indicating condition and including means for transferring electrical power from said input terminal means to said load terminal means and operating said inverter means to an inactive condition in sad line-power state and means for interrupting said transfer and operating said inverter mans to an active condition providing electrical power to said load terminal means in said battery-power state;
   disabling means for preventing transition of said control switching means from said line-power state back to said battery-power state for a given period of time after transition of said fault detector means from a low-voltage-indicating condition to a normal-voltage-indicating condition so that transient inrush currents into said load producing a momentary low-voltage condition on said power lines do not cause actuation of said control switching means back to said battery-power state.

2. The power supply of claim 1 wherein said disabling means includes means for actuating said fault detector means to maintain said normal-voltage-indicating condition during said given period of time.

3. The power supply of claim 1 wherein said control switching means includes master switching means operable between a power-off state and a power-on state and including means operable responsively to each operation to said power-off state for establishing a disabling condition disabling said inverter means and said control switching means from providing electrical power to said load terminal means: means responsive to subsequent operation of said master switching means to said power-on state for removing said disabling condition and means for preventing transition of said control switching means from said line-power state to said battery-power state for a given interval of time upon the first provision of electrical power to said output terminal means.

4. A standby power supply for providing electrical power to a load comprising:
   input terminal means adapted for connection to electrical power lines;
   load terminal means adapted for connection to said load;
   battery-operated inverter means for supplying electrical power to said load terminal means and having a given maximum output current rating;
   fault detector means coupled to said input terminal means for producing a low-voltage-indicating condition responsively to the presence of a power line voltage having an amplitude below a given value and for producing a normal-voltage-indicating condition responsively to the presence of a power line voltage having an amplitude above said given value;
   control switching means operable to a first state supplying electrical power from said input terminal means to said load terminal means and including means for disabling said inverter means to anon-power-supplying condition to said load terminal means and operable to a second state interrupting said supplying of electrical or from said input terminal means to said load terminal means and including means for actuating said inverter means to a power-supplying condition to said load terminal means, said control switching means further including means responsive to said fault detector means for actuating said control switching means to said second state responsively to the presence of said low-voltage-indicating condition and to said first state responsively to the presence of said normal-voltage-indicating condition;
   current sensing means responsive to the current drawn by said load when said control switching system is in said first state for providing an overload-indicating signal condition when the current drawn by said load exceeds said maximum current rating of said inverter means; and
   transition-disabling means responsive to said current sensing means for preventing operation of said control switching means from said first to said second state thereof responsively to the presence of said overload-indicating signal condition.

5. The power supply of claim 4 further including alarm means responsive to said power sensing means for producing an alerting alarm to the operator responsively to the presence of said overload-indicating condition.

6. The power supply of claim 4 wherein said inverter means includes an output transformer connected to said load terminal means to supply electrical power thereto, switching drivers for switchingly applying battery voltage to the input of said transformer responsively to excitation voltages applied to said drivers, and oscillator means for supplying said excitation voltages, and said control switching means includes inverter control logic means for disabling said inverter means by disconnecting said oscillator means from said drivers responsively to the presence of said normal-voltage-indicating signal condition.

7. A power supply for providing elec'rical power to a load in case of power line voltage failure comprising:
   input terminal means adapted for connection to electrical power lines;
   load terminal means adapted for connection to said load;
   battery-operated inverter means for providing electrical power to said load terminals;
   fault detector means responsively coupled to said input terminal means for producing a low-voltageindicating condition responsively to the presence of a power line voltage having an amplitude below a given value and for producing a normal-voltage-indicating condition responsively to the presence of a power line voltage having an amplitude above said given value;

control switching means responsively coupled to said fault detector and operable to a line-power state responsively to the presence of said normal-voltage-indicating condition and to a battery-power state responsively to the presence of said low-voltage-indicating condition and including electromechanical relay means having coil means and contact means operable to a closed condition to transfer electrical power from said input terminal means to said load terminal means in said line-power state and including means for operating said inverter means to an inactive condition in said line-power state and including means for interrupting said transfer by operating said contact means to an open condition in said battery-power state and for operating said inverter means to an active condition providing electrical power to said load terminal means in said battery-power state, said relay means being characterized by a known release time delay after a change of energization state of said coil means before said contact means actuate to said open condition and a known drop-in time delay after a reversal of said energization state until said contact means actuate to said closed condition; and synchronizing means responsive to the presence of said low-voltage-indicating condition for delaying actuation of said inverter means to said power-supplying condition by an amount slightly greater than said release time delay, and including means responsive to power line voltage waveform sensings and the presence of said normal-voltage sensing condition for reversing the energization state of said coil means at a preset time prior to an axis crossing, said preset time being such as to cause closure of said contact means in the immediate vicinity of said axis crossing and means for operating said inverter means to a non-power-supplying condition immediately prior to such closure.

8. The power supply of claim 7 wherein said contact means are in a normally-closed state with said coil means in a de-energized condition, and said control switching means energizes said coil means during a transition from a line-powered state to a battery-powered state, said coil means being characterized by a given minimum opening current to open said contact means and a given holding current to maintain an open condition thereafter, said switching control means further including pulsing means for providing to said coil means a transient current substantially greater than said minimum opening current and for thereafter providing thereto a maintenance current not substantially greater than said minimum holding current.

9. The power supply of claims 7 or 8 wherein said inverter means includes output transformer means connected to said load terminal means and battery charging means powered by said output transformer means when said control switching means is in said line-powered state.

10. The power supply of claim 7 wherein said coil means includes a plurality of diodes connected across said coil means to shuntingly absorb transient voltages from said coil means during the de-energization thereof and having a reverse breakdown in excess of the d.c. voltage drop across said coil means when energized and a forward voltage drop in excess of that of any one of said diodes, said forward drop being chosen to regulate the rate of field collapse in said coil means to a chosen value.

11. The power supply of claim 10 wherein said plurality of diodes includes s breakover first diode having a given reverse breakdown voltage connected in series with a second diode in a blocking direction with respect thereto, so that the forward drop of said diode means is approximately the reverse breakdown voltage of said first diode and the reverse breakdown voltage of said diode means is approximately the reverse breakdown voltage of said second diode.

12. In a standby power supply for providing electrical power to a load and including input terminal means adapted for connection to electrical power lines, load terminal means adapted for connection to said load, battery-operated inverter means for supplying electrical power to said load terminal means, fault detector means coupled to said input terminal means for producing a low-voltage-indicating condition responsively to the presence of a power line voltage having an amplitude below a given value and for producing a normal-voltage-indicating condition responsively to the presence of a power line voltage having an amplitude above said given value, the improvement comprising:

electromechanical relay means having coil means and contact means for transferring therethrough electrical power from said input terminal means to said load terminal means, said coil means being responsive to the application of a control current therethrough to operate said contact means to a change of state;

control switching means operable to a first state actuating said relay means to transfer said electrical power therethrough and including means for operating said inverter means to a non-power-supplying condition to said load terminal means and operable to a second state actuating said relay means to interrupt said supplying of electrical power from said input terminal means to said load terminal means and including means for actuating said inverter means to a power-supplying condition to said load terminal means, said control switching means further including means responsive to said fault detector means for actuating said control switching means to said second state responsively to the presence of said low-voltage-indicating condition and to said first state responsively to the presence of said normal-voltage-indicating condition; and diode means comprising a plurality of diodes connected across said coil means to shuntingly absorb transient voltages from said coil means during the de-energization thereof and having a reverse breakdown in excess of the d.c. voltage drop across said coil means when energized and a forward voltage drop in excess of that of any one of said diodes, said forward drop being chosen to regulate the rate of field collapse in said coil means to a chosen value.

13. The power supply of claim 12 wherein said diode means includes a breakover first diode having a given reverse breakdown voltage connected in series with a second diode in a blocking direction with respect thereto, so that the forward drop of said diode means is approximately the reverse breakdown voltage of said first diode means is approximately the reverse breakdown voltage of said second diode.

* * * * *

UNITED STATES PATENT AND TRADEMARK OFFICE
CERTIFICATE OF CORRECTION

PATENT NO. : 4,956,563

DATED : September 11, 1990

INVENTOR(S) : Louis W. Schornack

It is certified that error appears in the above-identified patent and that said Letters Patent is hereby corrected as shown below:

Column 11, line 5, replace "12" by --I2--.
Column 20, line 16, replace "VN" by --VN'--.
Column 21, line 5, replace "SIA" by --S1A".
Column 22, line 65, replace "SIB" by --S1B".

line 60, replace "R" by --R'--.
Column 26, line 63, replace "KCI" by --KC1--.
Column 1, line 44, delete "(".
Column 29, line 12, replace "R" by --R'--.
        line 18, replace "R" by --R'--.

Claim 4, column 40, line 20, replace "or" by --power--.
Claim 11, column 42, line 7, replace "s" by --a--.

UNITED STATES PATENT AND TRADEMARK OFFICE
CERTIFICATE OF CORRECTION

PATENT NO. : 4,956,563

DATED : September 11, 1990

INVENTOR(S) : Louis W. Schornack

It is certified that error appears in the above-identified patent and that said Letters Patent is hereby corrected as shown below:

Claim 13, column 42, line 66, after "diode" insert --and the reverse breakdown voltage of said diode--.

Signed and Sealed this

Twenty-fourth Day of November, 1992

Attest:

DOUGLAS B. COMER

Attesting Officer

Acting Commissioner of Patents and Trademarks